US011064362B2

(12) United States Patent
Suzuki

(10) Patent No.: US 11,064,362 B2
(45) Date of Patent: Jul. 13, 2021

(54) COMMUNICATION DEVICE

(71) Applicant: Brother Kogyo Kabushiki Kaisha, Nagoya (JP)

(72) Inventor: Satoshi Suzuki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 255 days.

(21) Appl. No.: 16/360,318

(22) Filed: Mar. 21, 2019

(65) Prior Publication Data
US 2019/0306705 A1    Oct. 3, 2019

(30) Foreign Application Priority Data

Mar. 30, 2018    (JP) .............................. JP2018-068818

(51) Int. Cl.
*H04W 12/63* (2021.01)
*H04L 9/08* (2006.01)
*H04W 12/062* (2021.01)
*H04W 12/0431* (2021.01)

(52) U.S. Cl.
CPC .......... *H04W 12/63* (2021.01); *H04L 9/0825* (2013.01); *H04W 12/0431* (2021.01); *H04W 12/062* (2021.01)

(58) Field of Classification Search
CPC ................................................... H04W 12/63
See application file for complete search history.

(56) References Cited

U.S. PATENT DOCUMENTS

| | | | | |
|---|---|---|---|---|
| 8,761,118 B2 * | 6/2014 | Aibara | ................ | H04W 36/385 370/331 |
| 9,288,756 B2 * | 3/2016 | Stojanovski | .......... | H04L 5/0035 |
| 9,424,547 B2 * | 8/2016 | Gazdzinski | ........ | G06Q 10/0832 |
| 2007/0124516 A1 * | 5/2007 | Ohara | .................. | H04N 1/4433 710/62 |
| 2013/0346168 A1 * | 12/2013 | Zhou | ....................... | G06F 1/163 705/14.4 |
| 2018/0069718 A1 | 3/2018 | Terao | | |

FOREIGN PATENT DOCUMENTS

JP    2018-037978 A    3/2018

OTHER PUBLICATIONS

Wi-Fi Alliance, "DRAFT Device Provisioning Protocol Technical Specification", Version 0.2.11, pp. 1-133, 2017.

* cited by examiner

*Primary Examiner* — Simon P Kanaan
(74) *Attorney, Agent, or Firm* — Banner & Witcoff, Ltd.

(57) ABSTRACT

A communication device may send a public key externally; receive a specific signal from a first external device; determine whether a radio field intensity of the received specific signal is equal to or greater than a threshold value; receive an authentication request from the first external device; in a case where it is determined that the radio field intensity is equal to or greater than the threshold value and the authentication request is received from the first external device, send an authentication response to the first external device; after the authentication response has been sent to the first external device, receive connection information from the first external device; and establish, by using the connection information, a wireless connection between the communication device and a second external device.

20 Claims, 10 Drawing Sheets

(Bootstrapping: Case A)

(Network Access)

(Bootstrapping and Authentication: Case C)

(Bootstrapping: Case D)

COMMUNICATION DEVICE

CROSS-REFERENCE

This application claims priority to Japanese Patent Application No. 2018-068818, filed on Mar. 30, 2018, the entire contents of which are incorporated herein by reference.

TECHNICAL FIELD

The disclosure herein discloses a technique related to a communication device configured to establish a wireless connection with an external device.

BACKGROUND ART

A Device Provisioning Protocol (DPP) scheme, which is a wireless communication scheme established by the Wi-Fi Alliance, is known. The DPP scheme is a wireless communication scheme for easily establishing a Wi-Fi connection between a pair of devices. As an example of public key sharing, it is known that a Responder sends a public key to an Initiator by using Bluetooth (registered trademark) communication.

SUMMARY

In the above technique, there is no disclosure regarding restriction on sending the public key. Due to this, when the Responder sends the public key by using Bluetooth communication, a device different from the Initiator which a user intends to use may receive the public key. As a result, a Wi-Fi connection may be established between a pair of devices which the user does not intend.

The disclosure herein discloses a technique capable of preventing a wireless connection from being established between a pair of devices which a user does not intend.

A communication device disclosed herein may comprise: a first wireless interface; a second wireless interface different from the first wireless interface; a processor; and a memory storing computer-readable instructions therein, the computer-readable instructions, when executed by the processor, causing the communication device to: send a public key externally via the first wireless device; receive a specific signal from a first external device via the first wireless interface; in a case where the specific signal is received from the first external device, determine whether a radio field intensity of the received specific signal is equal to or greater than a threshold value; after the public key has been sent externally, receive an authentication request in which the public key is used from the first external device via the second wireless interface; in a case where it is determined that the radio field intensity is equal to or greater than the threshold value and the authentication request is received from the first external device, send an authentication response to the first external device via the second wireless interface, wherein in a case where it is determined that the radio field intensity is not equal to or greater than the threshold value and the authentication request is received from the first external device, sending of the authentication response to the first external device is restricted; after the authentication response has been sent to the first external device, receive connection information from the first external device via the second wireless interface, the connection information being for establishing a wireless connection between the communication device and a second external device via the second wireless interface; and in a case where the connection information is received from the first external device, establish, by using the connection information, the wireless connection between the communication device and the second external device via the second wireless interface.

Another communication device disclosed herein may comprise: a first wireless interface; a second wireless interface different from the first wireless interface; a processor; and a memory storing computer-readable instructions therein, the computer-readable instructions, when executed by the processor, causing the communication device to: send a public key externally via the first wireless device; receive from a first external device a specific signal including target identification information for identifying the first external device via the first wireless interface; after the public key has been sent externally, receive an authentication request in which the public key is used from a specific external device via the second wireless interface, the authentication request including specific identification information for identifying the specific external device; in a case where the specific signal is received from the first external device and the authentication request is received from the specific external device, determine whether the specific identification information included in the authentication request is identical to the target identification information included in the specific signal; in a case where it is determined that the specific identification information is identical to the target identification information, send an authentication response to the specific external device which is identical to the first external device via the second wireless interface, wherein in a case where it is determined that the specific identification information is not identical to the target identification information, sending of the authentication response to the specific external device is restricted; after the authentication response has been sent to the specific external device, receive connection information from the specific external device via the second wireless interface, the connection information being for establishing a wireless connection between the communication device and a second external device via the second wireless interface; and in a case where the connection information is received from the specific external device, establish, by using the connection information, the wireless connection between the communication device and the second external device via the second wireless interface.

Another communication device disclosed herein may comprise: a first wireless interface; a second wireless interface different from the first wireless interface; a display unit; a processor; and a memory storing computer-readable instructions therein, the computer-readable instructions, when executed by the processor, causing the communication device to: send a public key externally via the first wireless device; after the public key has been sent externally, receive an authentication request in which the public key is used from a first external device via the second wireless interface; in a case where the authentication request is received from the first external device, cause the display unit to display an instruction screen for instructing to execute sending of an authentication response; in a case where it is instructed to execute the sending of the authentication response in a situation where the instruction screen is displayed, send the authentication response to the first external device via the second wireless interface; after the authentication response has been sent to the first external device, receive connection information from the first external device via the second wireless interface, the connection information being for establishing a wireless connection between the communication device and a second external device via the second wireless interface; and in a case where the connection information is received from the first external device, establish, by using the connection information, the wireless connection between the communication device and the second external device via the second wireless interface.

Computer programs for realizing the above communication devices, and non-transitory computer-readable recording media that store these computer programs are also novel and useful. Further, methods performed by the above communication devices are also novel and useful. In addition, communication systems comprising the above communication devices and another device (e.g., the first external device, the second external device) are also novel and useful.

BRIEF DESCRIPTION OF THE DRAWINGS

EMBODIMENT (Configuration of Communication System 2; FIG. 1)

As shown in FIG. 1, a communication system 2 is provided with an Access Point (AP) 6, a plurality of terminals 10, 50, and a printer 100. In this embodiment, a situation is assumed in which a user uses the terminals 10, 50 to establish a wireless connection according to a Wi-Fi scheme (hereinbelow termed "Wi-Fi connection") between the printer 100 and the AP 6.

(Configurations of Terminals 10, 50)

Figure 1:
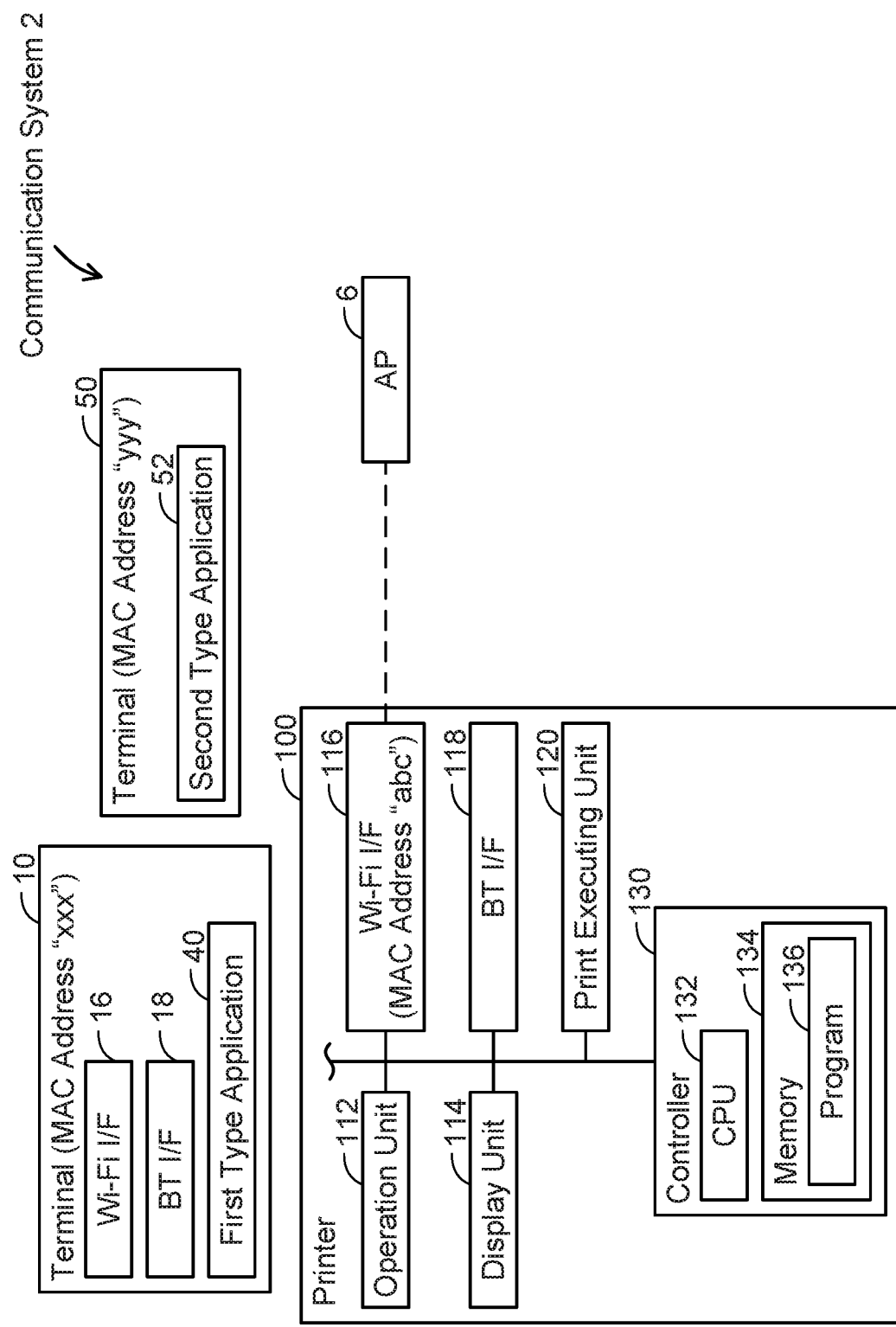
FIG. 1 shows a configuration of a communication system.

Each of the terminals 10, 50 is a portable terminal device such as a cell phone (e.g., a smartphone), a PDA, a tablet PC, and the like. In a variant, each of the terminals 10, 50 may be a stationary PC or a laptop PC. The terminal 10 is assigned with a MAC address "xxx". The terminal 50 is assigned with a MAC address "yyy". Here, the terminals 10, 50 have a similar configuration. As such, hereinbelow, the configuration of the terminal 10 will mainly be described.

The terminal 10 includes a Wi-Fi interface 16 and a Bluetooth (BT) interface 18. Hereinbelow, an interface will be denoted simply as "I/F".

The Wi-Fi I/F 16 is a wireless interface configured to execute Wi-Fi communication according to the Wi-Fi scheme. The Wi-Fi scheme is a wireless communication scheme for executing wireless communication according to 802.11 standard of IEEE (the Institute of Electrical and Electronics Engineers, Inc.) and standards complying thereto (such as 802.11a, 11b, 11g, 11n, 11ac, etc.), for example. The Wi-Fi I/F 16 especially supports a Device Provisioning Protocol (DPP) scheme that is to be established by the Wi-Fi Alliance. The DPP scheme is described in the standard draft "DRAFT Device Provisioning Protocol Technical Specification Version 0.2.11" created by the Wi-Fi Alliance, and is a wireless communication scheme for easily establishing a Wi-Fi connection between a pair of devices (such as the printer 100 and the AP 6) by using the terminal 10.

The BT I/F 18 is an I/F for executing communication according to a BT scheme version 4.0 or higher (communication according to so-called Blue Tooth Low Energy scheme). The BT scheme is, for example, a wireless communication scheme based on the standard of IEEE 802.15.1 or standards complying therewith.

The terminal 10 stores a first type application (which will be hereinbelow denoted simply as "first type app") 40. The first type app 40 is a program provided by a vendor of the printer 100, and is installed to the terminal 10 from a server on the Internet provided by the vendor of the printer 100, for example. Further, the terminal 50 stores a second type application (which will be hereinbelow denoted simply as "second type app") 52. The second type app 52 is a program provided by an entity different from the vendor of the printer 100. The first type app 40 and the second type app 52 are both programs for establishing a Wi-Fi connection between the printer 100 and the AP 6 according to the DPP scheme. In a variant, the first type app 40 may be a program provided by an entity different from the vendor of the printer 100, and the second type app 52 may be a program provided by the vendor of the printer 100. Further, in another variant, the second type app 52 may be an OS program for realizing basic operations of the terminal 50.

(Configuration of Printer 100)

The printer 100 is a peripheral (e.g., a peripheral of the terminal 10) capable of executing a print function. The printer 100 is provided with an operation unit 112, a display unit 114, a Wi-Fi I/F 116, a BT I/F 118, a print executing unit 120, and a controller 130. The respective units 112 to 130 are connected to a bus line (for which a reference sign is not given).

The operation unit 112 is provided with a plurality of keys. The user can input various instructions to the printer 100 by operating the operation unit 112. The display unit 114 is a display configured to display various types of information. The Wi-Fi I/F 116 is similar to the Wi-Fi I/F 16 of the terminal 10. That is, the Wi-Fi I/F 116 supports the DPP scheme. Further, the Wi-Fi I/F 116 is assigned with a MAC address "abc". The BT I/F 118 is similar to the BT I/F 18 of the terminal 10. The print executing unit 120 includes a print mechanism of an inkjet scheme or a laser scheme.

Here, differences between the Wi-Fi scheme and the BT scheme will be described. A communication speed of Wi-Fi communication (a maximum communication speed of 600 (Mbps), for example) is faster than a communication speed of BT communication (a maximum communication speed of 24 (Mbps), for example). A frequency of carrier waves used in Wi-Fi communication is 2.4 (GHz) band or 5.0 (GHz) band. A frequency of carrier waves used in BT communication is 2.4 (GHz) band. That is, in a case where 5.0 (GHz) band is employed as the frequency of carrier waves in Wi-Fi communication, the frequency of carrier waves in Wi-Fi communication and the frequency of carrier waves in BT communication are different. Further, a maximum distance with which Wi-Fi communication can be executed (about 100 (m), for example) is greater than a maximum distance with which BT communication can be executed (about several ten (m), for example).

The controller 130 includes a CPU 132 and a memory 134. The CPU 132 is configured to execute various processes according to a program 136 stored in the memory 134. The memory 134 is constituted of a volatile memory, a nonvolatile memory and the like.

Figure 2:
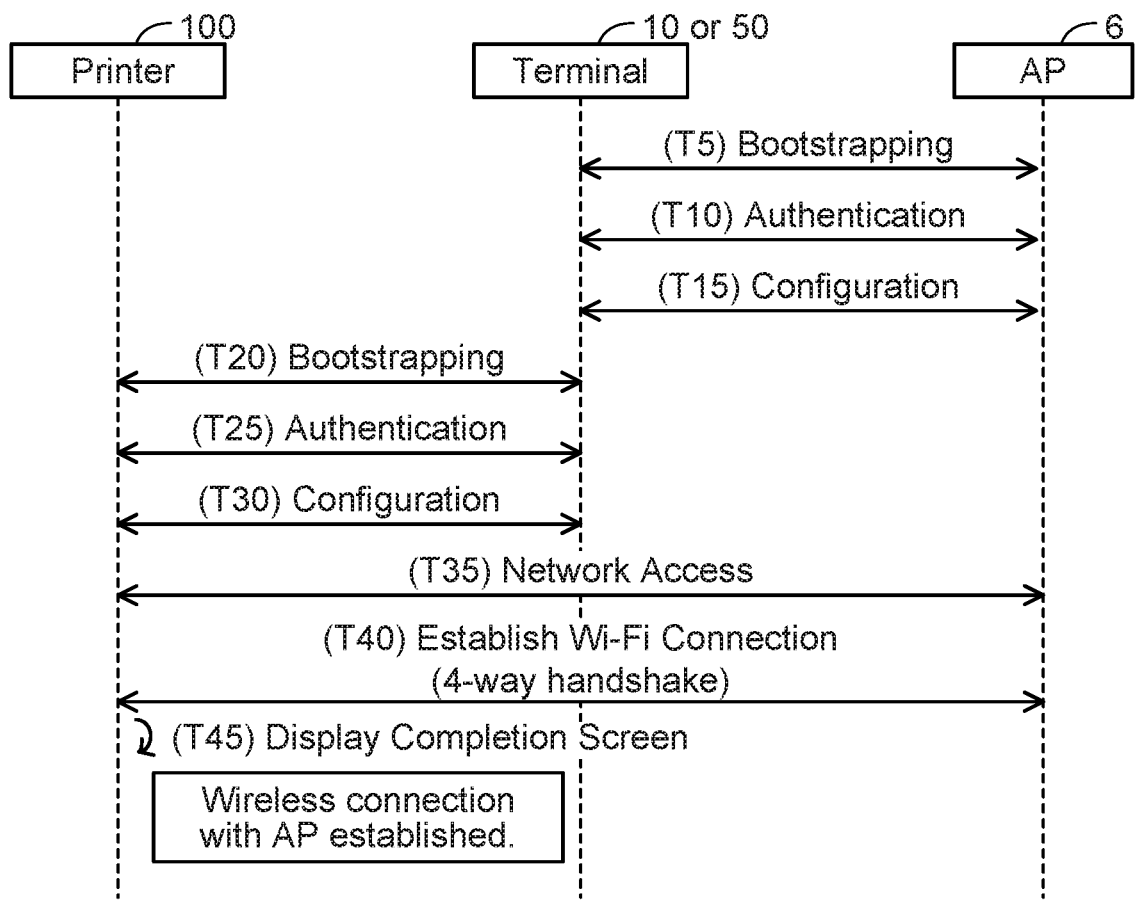
FIG. 2 is an explanatory diagram for explaining an overview of an embodiment.

Overview of Embodiment; FIG. 2

Next, an overview of the embodiment will be described with reference to FIG. 2. Although it has been aforementioned that each of the terminals 10, 50 and the printer 100 supports the DPP scheme, the AP 6 also supports the DPP scheme. Further, in this embodiment, a Wi-Fi connection is established between the printer 100 and the AP 6 by each of the devices 6, 10 (or 50), 100 executing communication according to the DPP scheme. Processes executed by the terminal 10 and processes executed by the terminal 50 are similar to each other except for some of the processes (such as T122 to T132 of FIG. 3 to be described later). As such, description regarding the terminal 50 is omitted in FIG. 2. Further, hereinbelow, in order to facilitate understanding, processes which CPUs (such as the CPU 132) of the respective devices execute will not be described with the CPUs as the subjects of action, but with the respective devices (such as the printer 100) as the subjects of action.

In T5, the terminal 10 executes Bootstrapping (hereinbelow termed simply as "BS") according to the DPP scheme with the AP 6. This BS is a process of providing information that is to be used in Authentication (hereinbelow termed simply as "Auth") of T10 (to be described later) from the AP 6 to the terminal 10 in response to a QR code (registered trademark) adhered to the AP 6 being captured by the terminal 10.

In T10, the terminal 10 executes Auth according to the DPP scheme with the AP 6 by using the information obtained in the BS of T5. This Auth is a process for the terminal 10 and the AP 6 to authenticate their communication counterparts.

In T15, the terminal 10 executes Configuration (hereinbelow termed simply as "Config") according to the DPP scheme with the AP 6. This Config is a process of sending information for establishing the Wi-Fi connection between the printer 100 and the AP 6 to the AP 6. Specifically, in the Config, the terminal 10 creates a first Configuration Object (hereinbelow, Configuration Object is simply be termed "CO") for establishing the Wi-Fi connection between the printer 100 and the AP 6, and sends the first CO to the AP 6. As a result, the first CO is stored in the AP 6.

Next, in T20, the terminal 10 executes BS according to the DPP scheme with the printer 100. This BS is a process for the terminal 10 to provide the terminal 10 with information to be used in Auth of T25 (to be described later) via the BT I/F 118.

In T25, the terminal 10 executes Auth according to the DPP scheme with the printer 100 by using the information obtained in the BS of T20. This Auth is a process for the terminal 10 and the printer 100 to authenticate their communication counterparts.

In T30, the terminal 10 executes Config according to the DPP scheme with the printer 100. This Config is a process of sending information for establishing the Wi-Fi connection between the printer 100 and the AP 6 to the printer 100. In this Config, the terminal 10 creates a second CO for establishing the Wi-Fi connection between the printer 100 and the AP 6, and sends the second CO to the printer 100. As a result, the second CO is stored in the printer 100.

In T35, the printer 100 and the AP 6 use the stored first and second COs to execute Network Access (hereinbelow termed simply as "NA") according to the DPP scheme. The NA is a process of sharing a connection key for establishing the Wi-Fi connection between the printer 100 and the AP 6.

In T40, the printer 100 and the AP 6 execute 4way-handshake communication. In at least a part of the 4way-handshake communication, the printer 100 and the AP 6 communicate encrypted information encrypted by the connection key shared in the NA in T35. Further, in a case where decryption of the encrypted information succeeds, the Wi-Fi connection is established between the printer 100 and the AP 6. Due to this, the printer 100 can participate, as a child station, in a wireless network formed by the AP 6, as a result of which the printer 100 can execute communication via the AP 6 with other devices participating in the wireless network. In a variant, the printer 100 and the AP 6 may execute Simultaneous Authentication of Equals (SAE, also called "Dragonfly") communication, instead of the 4way-handshake communication.

In T45, the printer 100 causes the display unit 114 to display a completion screen indicating that the Wi-Fi connection has been established with the AP 6. When the process of T45 is completed, the process of FIG. 2 is terminated.

In the DPP scheme, in order to establish the Wi-Fi connection between the printer 100 and the AP 6, the user does not need to input information of the wireless network in which the AP 6 operates as a parent station (such as a Service Set Identifier (SSID) and a password) to the printer 100. As such, the user can easily establish the Wi-Fi connection between the printer 100 and the AP 6.

(Description on Respective Processes; FIGS. 3 to 10)

Next, details of the respective processes executed in T20 to T35 of FIG. 2 will be described with reference to FIGS. 3 to 10. Since the processes of T5 to T15 are similar to the processes of T20 to T30 except that the AP 6 is used instead of the printer 100, the detailed description thereof will be omitted. Further, FIGS. 3 to 5 and FIGS. 8 to 10 respectively show different cases of the BS or Auth executed between the terminals 10, 50 and the printer 100. These cases are processes executed in one embodiment.

Figure 3:
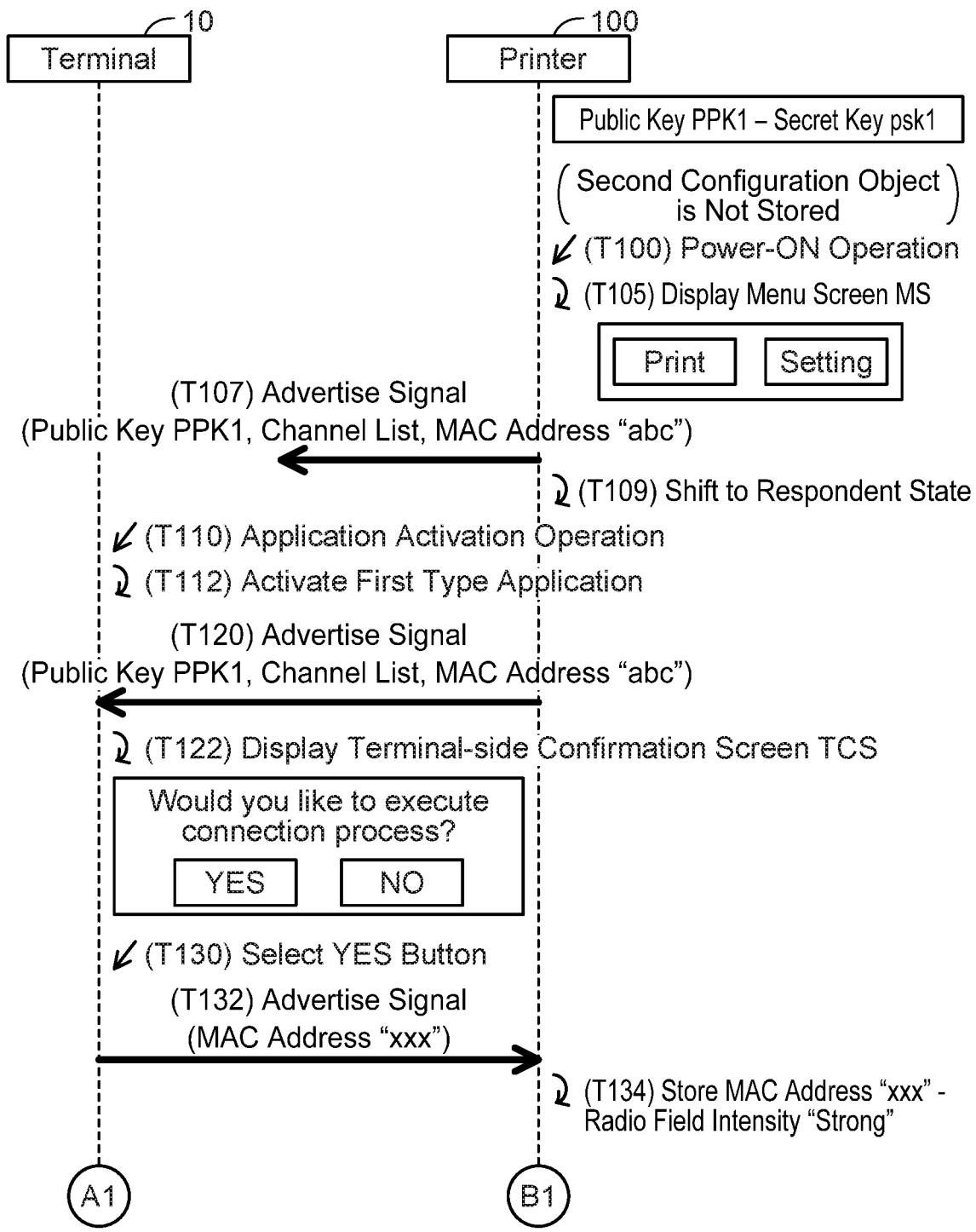
FIG. 3 shows a sequence diagram of a Bootstrapping process of Case A.

(Bootstrapping (BS) of Case A; FIG. 3)

Firstly, a process of the BS of Case A in T20 of FIG. 2 will be described with reference to FIG. 3. In an initial state of FIG. 3, the memory 134 of the printer 100 stores in advance a public key PPK1 and a secret key psk1 of the printer 100.

In response to accepting a power-ON operation by the user in T100, the printer 100 causes the display unit 114 to display a menu screen MS in T105. The screen MS is a default screen of the printer 100 in other words, and includes a print button for causing the printer 100 to execute print and a setting button for designating various settings (such as print setting) of the printer 100.

Next, the printer 100 starts to supply power to the BT I/F 118 since the memory 134 does not yet store the second CO (see T30 of FIG. 2). As such, in a state where the memory 134 does not store the second CO, power supply to the BT I/F 118 is started by the user simply turning on the power of the printer 100. Further, in T107, the printer 100 starts externally and repeatedly sending an Advertise signal (which will be hereinbelow denoted simply as "AD") according to the BT scheme via the BT I/F 118. This AD is a signal that can be communicated with a device, which is a communication target, even when pairing with this device has not yet been completed. The AD includes the public key PPK1 stored in advance in the memory 134, a channel list stored in advance in the memory 134, and the MAC address "abc" of the Wi-Fi I/F 116. The channel list is a list of values of a plurality of communication channels to be used in the Auth (see T25 of FIG. 2).

Next, in T109, the printer 100 shifts from a non-respondent state to a respondent state. As such, in the state where the memory 134 does not store the second CO, an operation state of the printer 100 is shifted from the non-respondent state to the respondent state by the user simply turning on the power of the printer 100. The non-respondent state is a state in which the Wi-Fi I/F 116 does not send a DPP Authentication Response (hereinbelow simply termed "ARes") (see T210 of FIG. 5 to be described later) even if a DPP Authentication Request (hereinbelow simply termed "AReq") is received from the terminal 10 (see T200 in FIG. 5 to be described later). The respondent state is a state in which the Wi-Fi I/F 116 sends the ARes to the terminal 10 in response to receiving the AReq from the terminal 10. That is, the printer 100 shifts to a state of being able to execute the Auth (see T25 of FIG. 2) by shifting from the non-respondent state to the respondent state. Specifically, in this embodiment, the non-respondent state is a state in which even if the Wi-Fi I/F 116 receives a signal from outside, it does not supply the signal to the CPU 132. Further, the respondent state is a state in which in response to receiving a signal from outside, the Wi-Fi I/F 116 supplies the signal to the CPU 132 and sends a response for this signal. Since the respondent state is a state in which the CPU 132 processes the signal received from outside, processing load in that state is higher than that in the non-respondent state. In a variant, the non-respondent state may be a state in which electricity is not supplied to the Wi-Fi I/F 116, and the respondent state may be a state in which electricity is supplied to the Wi-Fi I/F 116. Further, in another variant, the non-respondent state may be a state in which even if the Wi-Fi I/F 116 receives the AReq from outside, the Wi-Fi I/F 116 does not supply a notification that the AReq has been received to the CPU 132, and the respondent state may be a state in which in response to receiving the AReq from outside, the Wi-Fi I/F 116 supplies a notification that the AReq has been received to the CPU 132.

In response to accepting an activation operation for application by the user in T110, the terminal 10 activates the first type app 40 in T112. Processes herefrom executed by the terminal 10 are realized by the first type app 40. Next, the terminal 10 starts power supply to the BT I/F 18. Thus, the terminal 10 shifts to a state capable of receiving the AD (see T107) sent from the printer 100. As a result, in T120, the terminal 10 receives the AD from the printer 100 via the BT I/F 18, and obtains the respective information in the AD (that is, the public key PPK1, the channel list, and the MAC address "abc").

In T122, the terminal 10 displays a terminal-side confirmation screen TCS inquiring the user whether or not to execute a connection process for establishing the Wi-Fi connection between the printer 100 and the AP 6. The screen TCS includes a YES button indicating that the connection process is to be executed and a NO button indicating that the connection process is not to be executed. The terminal 10 accepts a selection of the YES button in the screen TCS by the user in T130, and sends an AD including the MAC address "xxx" of the Wi-Fi I/F 16 to the printer 100 via the BT I/F 18 in T132.

In a case of receiving the AD from the terminal 10 via the BT I/F 118 in T132, the printer 100 obtains a radio field intensity of the received AD. The BT I/F 118 specifies the radio field intensity of the AD when receiving this AD, and supplies the specified radio field intensity to the CPU 132. Due to this, the printer 100 (that is, the CPU 132) obtains the radio field intensity. Case A of FIG. 3 assumes a situation in which a distance between the terminal 10 and the printer 100 is relatively small, thus the printer 100 determines that the obtained radio field intensity is equal to or greater than a threshold value. This threshold value may be a value preset by the vendor of the printer 100 upon shipping of the printer 100, or may be a value designated by the user of the printer 100 after the shipping of the printer 100. In T134, the printer 100 associates the MAC address "xxx" in the AD received in T132 with a radio field intensity "Strong", which indicates that the radio field intensity thereof is equal to or greater than the threshold value, and stores them in the memory 134. In a case where the printer 100 determines that the obtained radio field intensity is less than the threshold value, it associates the MAC address "xxx" with a radio field intensity "Weak" and stores them in the memory 134. When the process of T134 is completed, the process of the BS in Case A is terminated.

Figure 4:
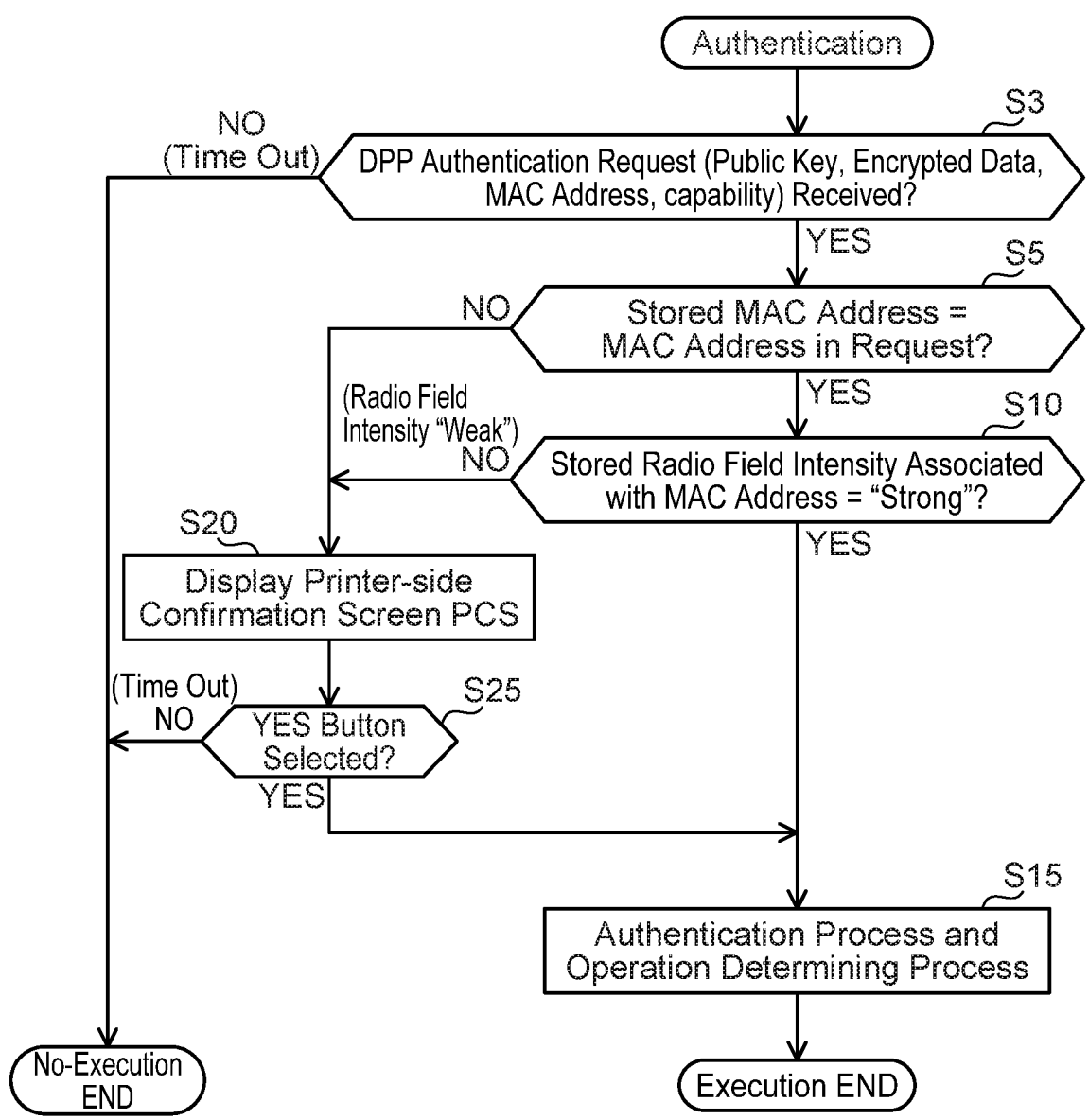
FIG. 4 shows a flowchart of an Authentication process.

(Authentication (Auth); FIG. 4)

Next, details of processes executed by the printer 100 in the process of the Auth of T25 of FIG. 2 will be described with reference to FIG. 4. The process of FIG. 4 is executed in response to the printer 100 shifting to the respondent state (T109 of FIG. 3).

In S3, the printer 100 monitors receipt of an AReq from outside via the Wi-Fi I/F 116. Hereinbelow, a terminal which is a sender of the AReq will be termed "specific terminal". The AReq includes a public key of the specific terminal, encrypted data created by the specific terminal, a MAC address of the specific terminal, and a capability of the specific terminal. The capability is information that is pre-designated in a device supporting the DPP scheme, and includes any one of the following values: a value indicating that a device is capable of operating only as a Configurator according to the DPP scheme, a value indicating that a device is capable of operating only as an Enrollee according to the DPP scheme, and a value indicating that a device is capable of operating whichever one of the Configurator and the Enrollee. The Configurator refers to a device that creates a CO for the Enrollee in the Config (T30 of FIG. 2) and sends this CO to the Enrollee. On the other hand, the Enrollee refers to a device that receives the CO to be used in the NA from the Configurator in the Config. The printer 100 determines YES in S3 in a case of receiving the AReq from outside, and proceeds to S5. On the other hand, in a case where the AReq is not received within a predetermined time since the printer 100 shifted to the respondent state (T109 of FIG. 3), the printer 100 determines NO in S3 and terminates the process of FIG. 4 as no-execution END. The no-execution END means to stop a process according to the DPP scheme.

In S5, the printer 100 determines whether or not the MAC address stored in the memory 134 (see T134 of FIG. 3) is identical to the MAC address in the received AReq. In a case of determining that the two MAC addresses are identical, the printer 100 determines that the specific terminal is identical to the terminal which is the sender of the AD (YES in S5) and proceeds to S10. On the other hand, in a case of determining that the two MAC addresses are not identical, the printer 100 determines that the specific terminal is different from the terminal which is the sender of the AD (NO in S5) and proceeds to S20.

In S10, the printer 100 determines whether or not the radio field intensity stored in the memory 134 (see T134 of FIG. 3) is "Strong". In a case where the stored radio field intensity is "Strong", the printer 100 determines YES in S10 and proceeds to S15. On the other hand, in a case where the stored radio field intensity is "Weak", the printer 100 determines NO in S10 and proceeds to S20.

In S15, the printer 100 executes an authentication process and an operation determining process. The authentication process is a process for the printer 100 to authenticate its communication counterpart. The operation determining process is a process for the printer 100 to determine whether to operates as the Configurator or the Enrollee. The printer 100 terminates the process of the Auth in a case where the authentication process and the operation determining process are completed.

In S20, the printer 100 causes the display unit 114 to display a printer-side confirmation screen PCS for confirming with the user that the connection process for establishing the Wi-Fi connection is to be executed. The screen PSC includes a YES button indicating that the connection process is to be executed.

In S25, the printer 100 determines whether or not the YES button in the screen PCS is selected by the user. In a case where the YES button in the screen PCS is selected by the user, the printer 100 determines YES in S25 and proceeds to S15. On the other hand, in a case where the YES button is not selected within a predetermined time since the screen PCS started to be displayed (that is, in a case of a timeout), the printer 100 determines NO in S25 and terminates the process of FIG. 4 as the no-execution END. In a variant, the screen PCS may include a NO button indicating that the connection process is not to be executed, and the printer 100 may determine NO in S25 in a case where the NO button in the screen PCS is selected by the user and may terminate the process of the Auth.

Figure 5:
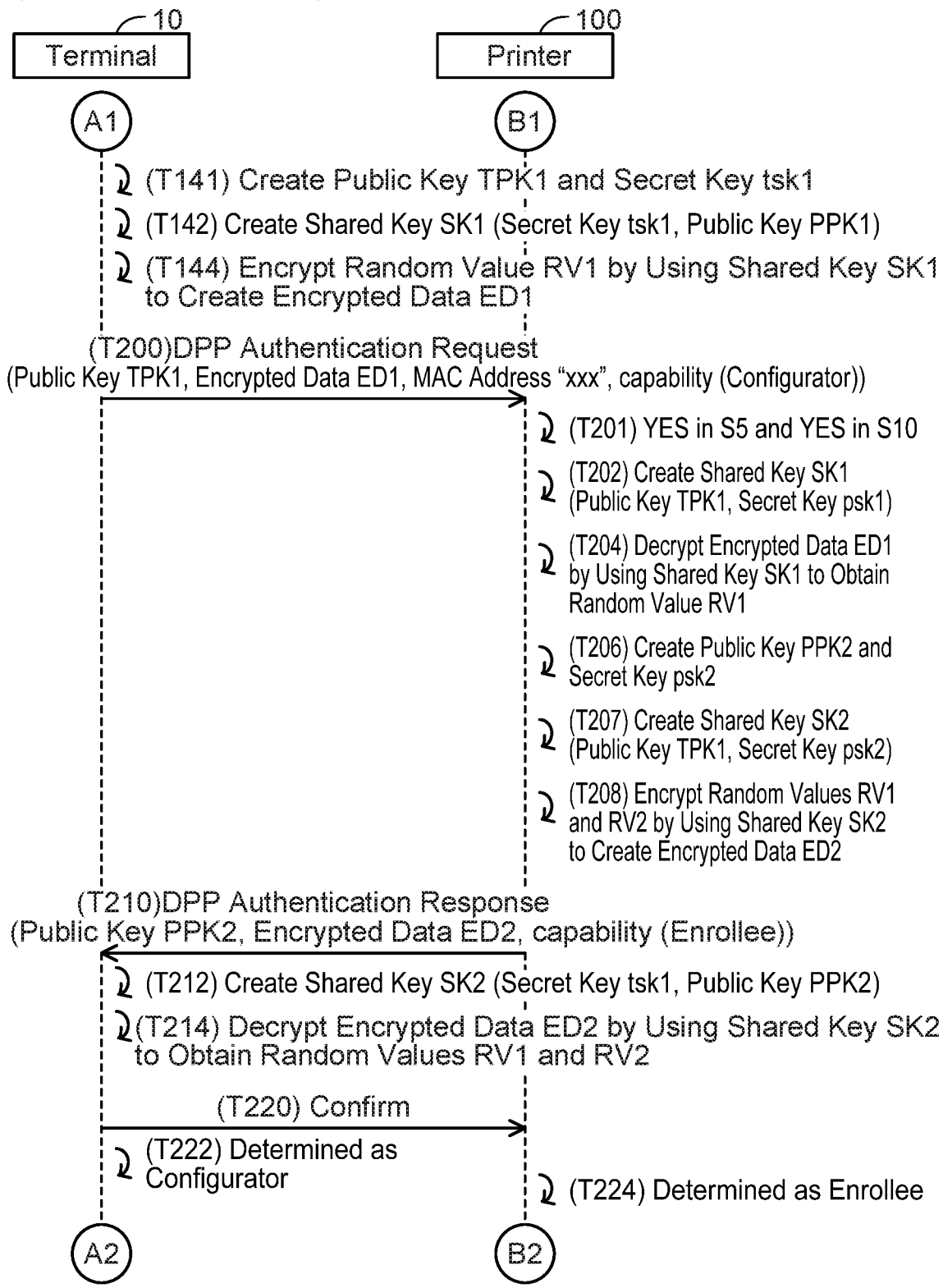
FIG. 5 shows a sequence diagram of an Authentication process of Case A.

(Authentication (Auth) of Case A; FIG. 5)

Next, the process of the Auth of Case A realized by the process of FIG. 4 will be described with reference to FIG. 5. After having sent the AD to the printer 100 in T132 of FIG. 3, the terminal 10 creates a public key TPK1 and a secret key tsk1 of the terminal 10 in T141. Next, in T142, the terminal 10 creates a shared key SK1 according to Elliptic curve Diffie-Hellman key exchange (ECDH) by using the created secret key tsk1 and the public key PPK1 of the printer 100 obtained in T120 of FIG. 3. Then, in T144, the terminal 10 creates encrypted data ED1 by using the created shared key SK1 to encrypt a random value RV1.

In T200, the terminal 10 sends the AReq via the Wi-Fi I/F 16 to the printer 100 by setting the MAC address "abc" obtained in T120 of FIG. 3 as its destination. The AReq is a signal for requesting the printer 100 to execute authentication. Here, the terminal 10 repeats sending the AReq to the printer 100 by sequentially using the plurality of communication channels in the channel list obtained in T134. The AReq includes the public key TPK1 of the terminal 10 created in T141, the encrypted data ED1 created in T144, the MAC address "xxx" of the terminal 10 and a capability of the terminal 10. As above, in this embodiment, the terminal 10 creates the first CO or the second CO and sends it to the AP 6 or the printer 100. As such, the capability of the terminal 10 includes the value indicating that it is capable of operating only as the Configurator.

The printer 100 receives the AReq from the terminal 10 via the Wi-Fi I/F 116 in T200 (YES in S3 of FIG. 4). As above, this AReq is sent with the MAC address "abc" of the printer 100 as the destination. As such, the printer 100 can suitably receive this AReq from the terminal 10.

Further, when the printer 100 shifts to the respondent state in T109 of FIG. 3, it monitors receipt of the AReq by using one communication channel among the plurality of communication channels in the channel list. As above, the AReq in T200 is sent by sequentially using the plurality of communication channels in the channel list. As such, the printer 100 can suitably receive this AReq from the terminal 10.

In T201, the printer 100 determines that the MAC address "xxx" stored in the memory 134 (see T134 of FIG. 3) is identical to the MAC address "xxx" in the AReq (YES in S5 of FIG. 4) as well as determines that the radio field intensity stored in the memory 134 (see T134 of FIG. 3) is "Strong" (YES in S10).

Next, the printer 100 executes the authentication process of T202 to T208 (S15). Specifically, firstly, in T202, the printer 100 creates a shared key SK1 according to the ECDH by using the public key TPK1 of the terminal 10 in the AReq and the secret key psk1 of the printer 100 stored in advance in the memory 134. Here, the shared key SK1 created by the terminal 10 in T142 and the shared key SK1 created by the printer 100 in T204 are identical to each other. Thus, the printer 100 can suitably decrypt the encrypted data ED1 in the AReq by using the created shared key SK1 in T204, as a result of which it can obtain the random value RV1. In a case where decryption of the encrypted data ED1 succeeds, the printer 100 determines that the sender of the AReq is the device that received the AD sent from the printer 100 (see T120 of FIG. 3), that is, determines that the authentication succeeded, and executes processes from T206. On the other hand, in a case where the decryption of the encrypted data ED1 does not succeed, the printer 100 determines that the sender of the AReq is not the device that received the AD sent from the printer 100, that is, determines that the authentication failed, and does not execute the processes from T206.

In T206, the printer 100 creates a new public key PPK2 and a new secret key psk2 of the printer 100. In a variant, the public key PPK2 and the secret key psk2 may be stored in advance in the memory 134. Next, in T207, the printer 100 creates a shared key SK2 according to the ECDH by using the public key TPK1 of the terminal 10 in the AReq of T200 and the created secret key psk2 of the printer 100. Then, in T208, the printer 100 creates encrypted data ED2 by using the created shared key SK2 to encrypt the obtained random value RV1 and a new random value RV2.

In T210, the printer 100 sends an ARes to the terminal 10 via the Wi-Fi I/F 116. This ARes includes the public key PPK2 of the printer 100 created in T206, the encrypted data ED2 created in T208, and a capability of the printer 100. This capability includes the value indicating that the printer 100 is capable of operating only as the Enrollee.

In response to receiving the ARes from the printer 100 via the Wi-Fi I/F 16 in T210, the terminal 10 executes following processes for authenticating the sender of the ARes (that is, the printer 100). Specifically, firstly in T212, the terminal 10 creates a shared key SK2 according to the ECDH by using the secret key tsk1 of the terminal 10 created in T141 and the public key PPK2 of the printer 100 in the ARes. Here, the shared key SK2 created by the printer 100 in T207 and the shared key SK2 created by the terminal 10 in T212 are identical to each other. Thus, the terminal 10 can suitably decrypt the encrypted data ED2 in the ARes by using the created shared key SK2 in T214, as a result of which it can obtain the random values RV1 and RV2. In a case where decryption of the encrypted data ED2 succeeds, the terminal 10 determines that the sender of the ARes is the sender device of the AD received in T120 of FIG. 3, that is, determines that the authentication succeeded, and executes processes from T220. On the other hand, in a case where the decryption of the encrypted data ED2 does not succeed, the terminal 10 determines that the sender of the ARes is not the sender device of the AD received in T120, that is, determines that the authentication failed, and does not execute the processes from T220.

In T220, the terminal 10 sends a Confirm to the printer 100 via the Wi-Fi I/F 16. The Confirm includes information indicating that the terminal 10 operates as the Configurator and the printer 100 operates as the Enrollee. As a result, the terminal 10 determines to operate as the Configurator in T222, and the printer 100 determines to operate as the Enrollee in T224 (the operation determining process in S14 of FIG. 4). When the process of T224 is completed, the process of Case A of Auth is terminated.

Figure 6:
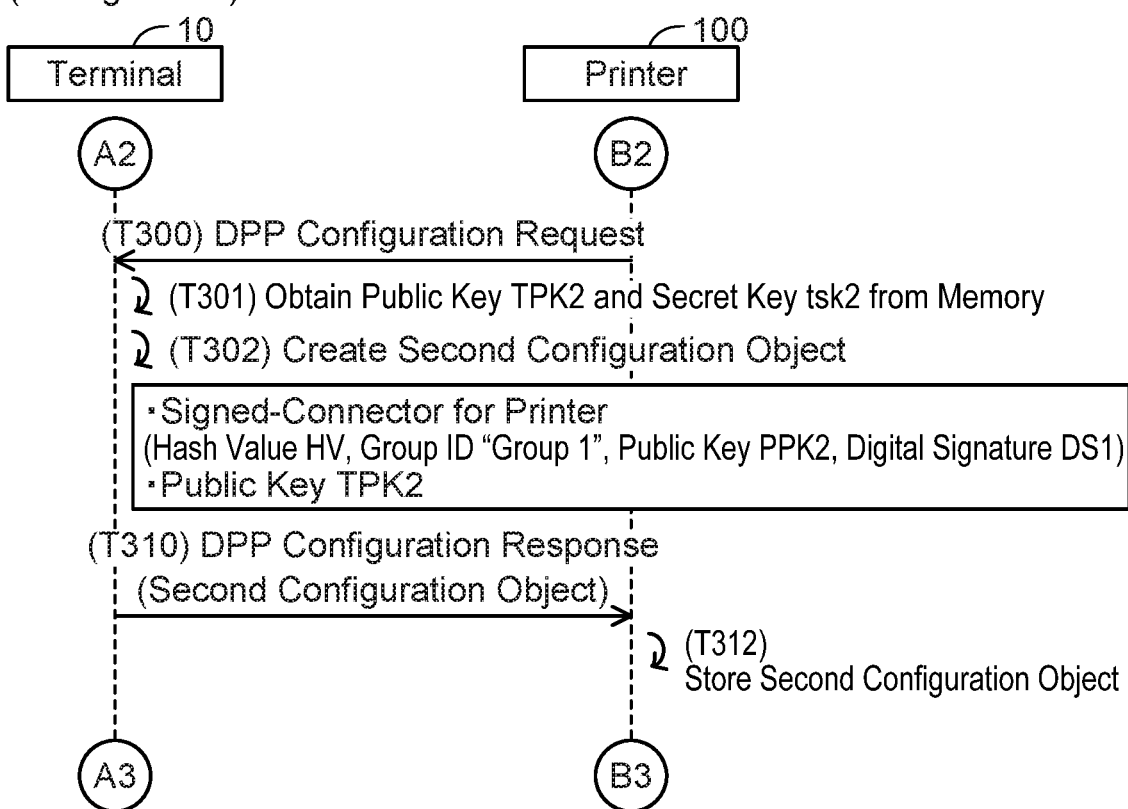
FIG. 6 shows a sequence diagram of a Configuration process.

(Configuration (Config); FIG. 6)

Next, the process of Config in T30 of FIG. 2 will be described with reference to FIG. 6. In T300, the printer 100 sends a DPP Configuration Request (hereinbelow termed simply as "CReq") to the terminal 10 via the Wi-Fi I/F 116. This CReq is a signal requesting the CO (that is, the information for establishing the Wi-Fi connection between the printer 100 and the AP 6) to be sent.

The terminal 10 receives the CReq from the printer 100 in T300 via the Wi-Fi I/F 16. In this case, the terminal 10 obtains a group ID "Group1", a public key TPK2, and a secret key tsk2 from a memory (not shown) of the terminal 10 in T301. As aforementioned, the terminal 10 have already executed the Config in T15 of FIG. 2 with the AP 6, and at that occasion the terminal 10 created the group ID "Group1", the public key TPK2, and the secret key tsk2 and stored the same in the memory. The group ID "Group1" is information for identifying a wireless network formed by the Wi-Fi connection being established between the printer 100 and the AP 6. In a variant, a character string designated by the user may be used as the group ID. That is, in T301, the terminal 10 obtains the respective information that were stored in T15 of FIG. 2. Next, in T302, the terminal 10 creates the second CO (see T30 of FIG. 2). Specifically, the terminal 10 executes following processes.

The terminal 10 creates a hash value HV by hashing the public key TPK2 of the terminal 10. Further, the terminal 10 creates a specific value by hashing a combination of the hash value HV, the group ID "Group1", and the public key PPK2 of the printer 100 in the ARes in T210 of FIG. 4. Then, the terminal 10 creates a digital signature DS1 by using the secret key tsk2 of the terminal 10 to encrypt the created specific value in accordance with an Elliptic Curve Digital Signature Algorithm (ECDSA). As a result, the terminal 10 can create a Signed-Connector for printer (hereinbelow, the Signed-Connector is termed simply as "SCont") including the hash value HV, the group ID "Group1", the public key PPK2 of the printer 100, and the digital signature DS1. Further, the terminal 10 creates the second CO including the SCont for printer and the public key TPK2 of the terminal 10.

In T310, the terminal 10 sends a DPP Configuration Response (hereinbelow termed simply as "CRes") including the second CO to the printer 100 via the Wi-Fi I/F 16.

The printer 100 receives the CRes from the terminal 10 in T310 via the Wi-Fi I/F 116. In this case, the printer 100 stores the second CO in the CRes in the memory 134 in T312. When the process of T312 is completed, the process of FIG. 6 is terminated.

Figure 7:
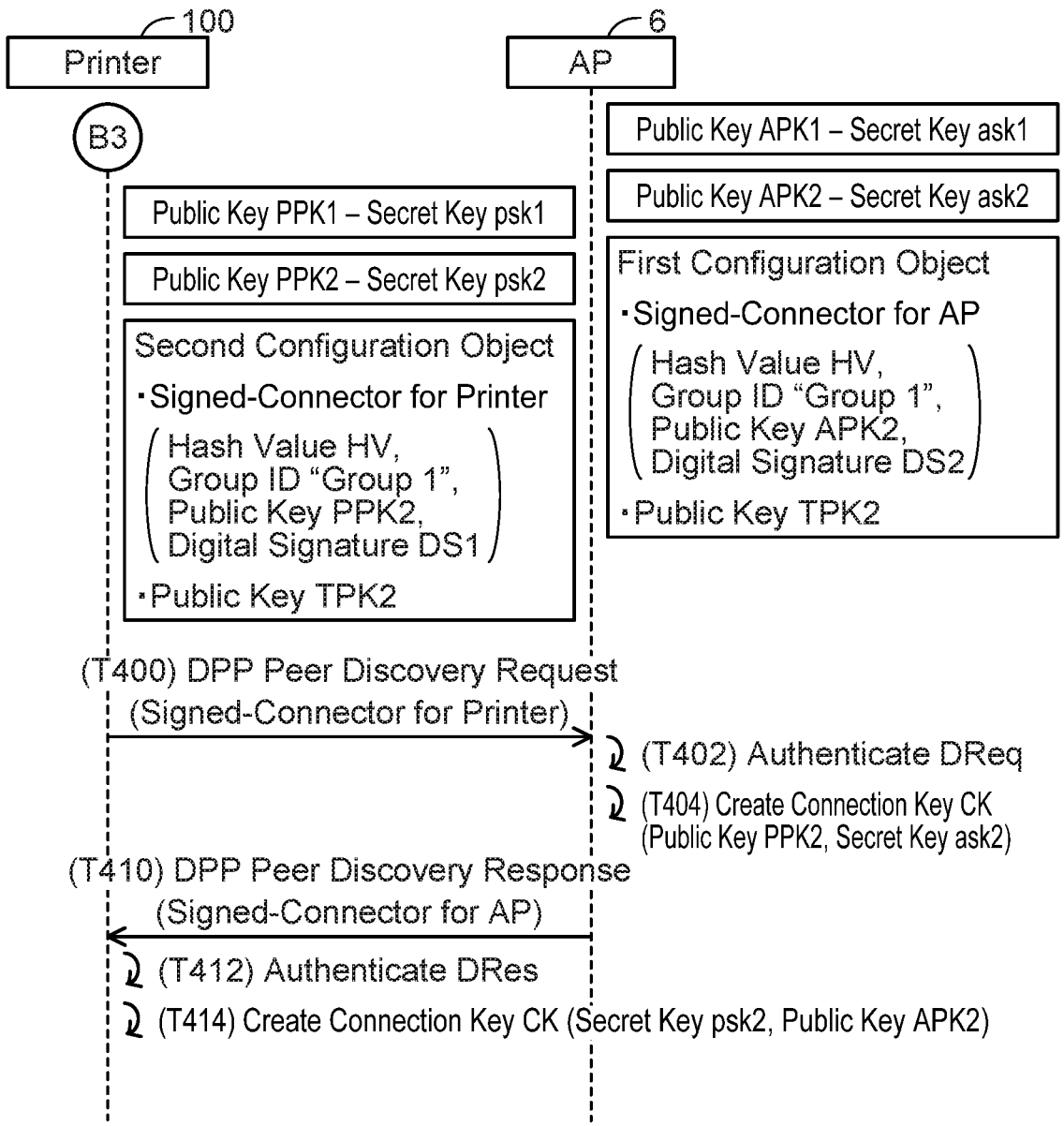
FIG. 7 shows a sequence diagram of a Network Access process.

(Network Access (NA); FIG. 7)

Next, the process of the NA in T35 of FIG. 2 executed between the printer 100 and the AP 6 will be described with reference to FIG. 7. As aforementioned, the processes of T5 to T15 of FIG. 2 have already been executed between the terminal 10 and the AP 6, similarly to T20 to T30 of FIG. 2. However, the AP 6 does not execute the processes of T105 to T134 of FIG. 3. The AP 6 stores in advance a public key APK1 and a secret key ask1 of the AP 6. Further, a QR code, which is obtained by coding the public key APK1 of the AP 6, a channel list of the AP 6, and a MAC address of the AP 6, is adhered to a housing of the AP 6. Processes similar to the processes from T141 of FIG. 5 are executed between the terminal 10 and the AP 6 when the terminal 10 captures this QR code. As a result, the AP 6 stores a public key APK2 and a secret key ask2 of the AP 6 (see T206), and further stores the first CO received from the terminal 10 (see T312 of FIG. 6). The first CO includes a SCont for AP and a public key TPK2 of the terminal 10. This public key TPK2 is identical to the public key TPK2 included in the second CO. Further, the SCont for AP includes a hash value HV, a group ID "Group1", the public key APK2 of the AP 6, and a digital signature DS2. This hash value HV and this group ID "Group1" are respectively identical to the hash value HV and the group ID "Group1" included in the second CO. The digital signature DS2 is information in which a specific value, which is obtained by hashing a combination of the hash value HV, the group ID "Group1", and the public key APK2, is encrypted by the secret key tsk2 of the terminal 10, and is a value different from the digital signature DS1 included in the second CO.

In T400, the printer 100 sends a DPP Peer Discovery Request (hereinbelow termed simply as "DReq") including the SCont for printer to the AP 6 via the Wi-Fi I/F 116. This DReq is a signal requesting the AP 6 to execute authentication and send the SCont for AP.

In response to receiving the DReq from the printer 100 in T400, the AP 6 executes a process for authenticating the sender of the DReq (that is, the printer 100) and the information in the DReq (that is, the hash value HV, the "Group1", and the public key PPK2). Specifically, in T402, the AP 6 firstly executes a first AP determination process that is regarding whether or not the hash value HV and the group ID "Group1" in the received SCont for printer are respectively identical to the hash value HV and the group ID "Group1" in the SCont for AP included in the stored first CO. In the case of FIG. 6, the AP 6 determines "identical" in the first AP determination process, thus it determines that the authentication of the sender of the DReq (that is, the printer 100) succeeds. Here, the fact that the hash value HV in the received SCont for printer is identical to the hash value HV in the SCont for AP included in the stored first CO means that the SCont for printer and the SCont for AP were created by the same device (that is, the terminal 10). As such, the AP 6 also determines that authentication of the creator of the received SCont for printer (that is, the terminal 10) succeeds. Further, the AP 6 decrypts the digital signature DS1 in the received SCont for printer by using the public key TPK2 of the terminal 10 included in the stored first CO. Since the decryption of the digital signature DS1 succeeds in the case of FIG. 6, the AP 6 executes a second AP determination process that is regarding whether or not a specific value obtained by decrypting the digital signature DS1 is identical to a value obtained by hashing the information in the received SCont for printer (that is, the hash value HV, the "Group1", and the public key PPK2). In the case of FIG. 6, the AP 6 determines "identical" in the second AP determination process, thus it determines that the authentication of the information in the DReq succeeds, and executes processes from T404. The fact that the AP6 determines "identical" in the second AP determination process means that the information in the received SCont for printer (that is, the hash value HV, the "Group1", and the public key PPK2) has not been tampered by a third party since the second CO was stored in the printer 100. On the other hand, in a case where the AP 6 determines "not identical" in the first AP determination process, in a case where the decryption of the digital signature DS1 fails, or in a case where the AP 6 determines "not identical" in the second AP determination process, the AP 6 determines that the authentication fails and does not execute the processes from T404.

Next, in T404, the AP 6 creates a connection key CK (that is, a shared key) by using the obtained public key PPK2 of the printer 100 and the stored secret key ask2 of the AP 6 in accordance with the ECDH.

In T410, the AP 6 sends a DPP Peer Discovery Response (hereinbelow termed simply as "DRes") including the SCont for AP to the printer 100.

In response to receiving the DRes from the AP 6 in T410 via the Wi-Fi I/F 116, the printer 100 executes a process for authenticating the sender of the DRes (that is, the AP 6) and the information in the DRes (that is, the hash value HV, the "Group1", and the public key APK2). Specifically, in T412, the printer 100 firstly executes a first PR determination process that is regarding whether or not the hash value HV and the group ID "Group1" in the received SCont for AP are respectively identical to the hash value HV and the group ID "Group1" in the SCont for printer included in the stored second CO. In the case of FIG. 7, the printer 100 determines "identical" in the first PR determination process, thus it determines that the authentication of the sender of the DRes (that is, the AP 6) succeeds. The fact that the hash value HV in the received SCont for AP is identical to the hash value HV in the SCont for printer included in the stored second CO means that the SCont for printer and the SCont for AP were created by the same device (that is, the terminal 10). As such, the printer 100 also determines that authentication of the creator of the received SCont for AP (that is, the terminal 10) succeeds. Further, the printer 100 decrypts the digital signature DS2 in the received SCont for AP by using the public key TPK2 of the terminal 10 included in the stored second CO. Since the decryption of the digital signature DS2 succeeds in the case of FIG. 7, the printer 100 executes a second PR determination process that is regarding whether or not a specific value obtained by decrypting the digital signature DS2 is identical to a value obtained by hashing the information in the received SCont for AP (that is, the hash value HV, the "Group1", and the public key APK2). In the case of FIG. 7, the printer 100 determines "identical" in the second PR determination process, thus it determines that the authentication of the information in the DRes succeeds, and executes processes from T414. The fact that the printer 100 determines "identical" in the second PR determination process means that the information in the received SCont for AP (that is, the hash value HV, the "Group1", and the public key APK2) has not been tampered by a third party since the first CO was stored in the AP 6. On the other hand, in a case where the printer 100 determines "not identical" in the first PR determination process, in a case where the decryption of the digital signature DS2 fails, or in a case where the printer 100 determines "not identical" in the second PR determination process, the printer 100 determines that the authentication fails and does not execute the processes from T414.

In T414, the printer 100 creates a connection key CK by using the stored secret key psk2 of the printer 100 and the public key APK2 of the AP 6 in the received SCont for AP in accordance with the ECDH. Here, the connection key CK created by the AP 6 in T404 and the connection key CK created by the printer 100 in T414 are identical to each other. Due to this, the connection key CK for establishing the Wi-Fi connection is shared between the printer 100 and the AP 6. When T414 is completed, the process of FIG. 7 is terminated.

As aforementioned, after the connection key CK is shared between the printer 100 and the AP 6, the printer 100 and the AP 6 execute the 4way-handshake communication by using the connection key CK in T40 of FIG. 2. As a result, the Wi-Fi connection is established between the printer 100 and the AP 6. As aforementioned, the printer 100 receives the AReq in T200 of FIG. 4 from the terminal 10 by using one communication channel among the plurality of communication channels included in the channel list of the printer 100. That is, the printer 100 receives the AReq in T200 from the terminal 10 by using the communication channel which both the printer 100 and the terminal 10 can use. On the other hand, in T40 of FIG. 2, the printer 100 establishes the Wi-Fi connection with the AP 6 by using the communication channel which both the printer 100 and the AP 6 can use. Here, the communication channel which the terminal 10 can use and the communication channel which the AP 6 can use may differ in some cases. In this embodiment, the communication channel by which the printer 100 receives the AReq from the terminal 10 in T200 of FIG. 4 is different from the communication channel by which the printer 100 establishes the Wi-Fi connection with the AP 6 in T40 of FIG. 2. However, in a variant, the former communication channel may be same as the latter communication channel.

Figure 8:
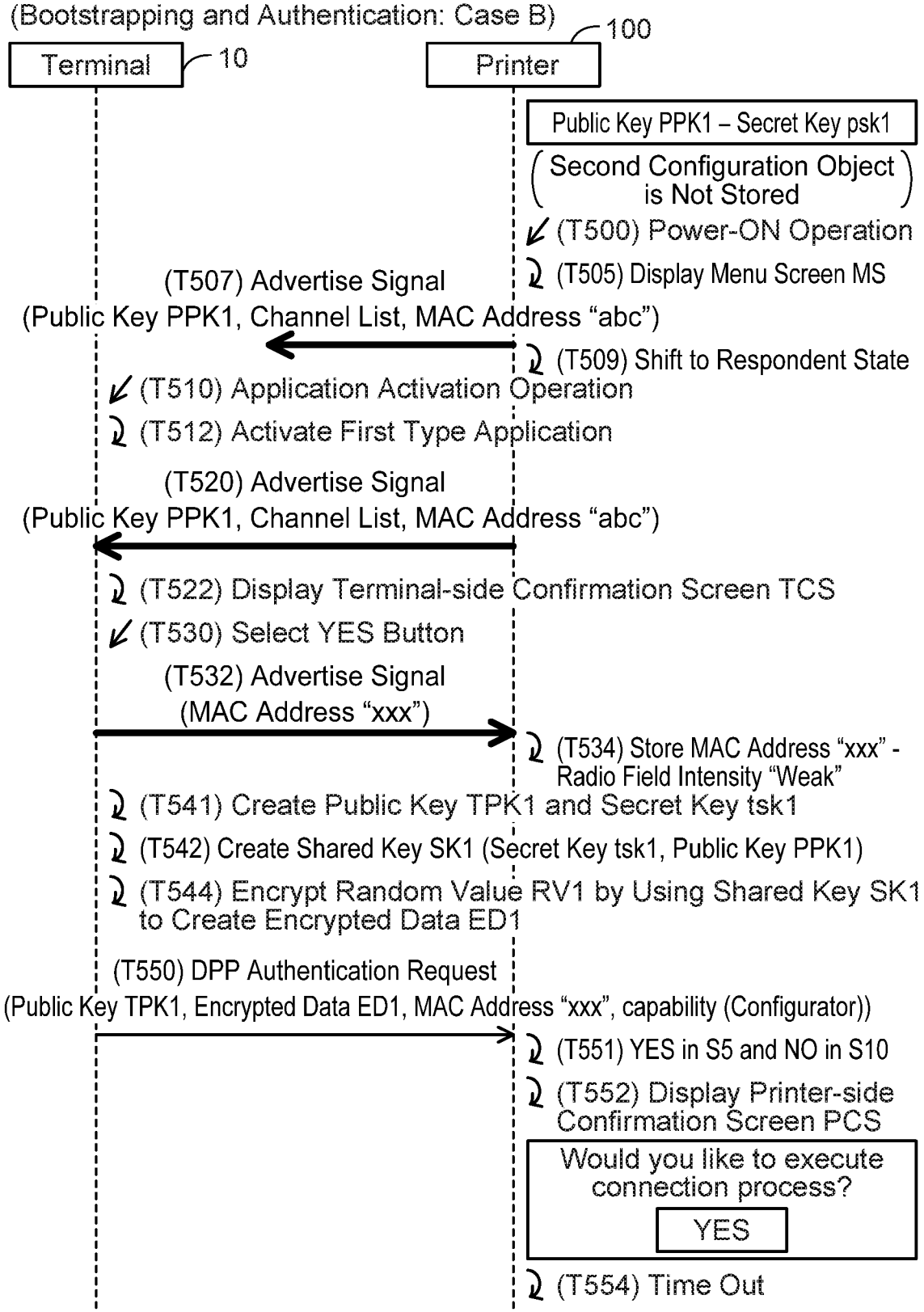
FIG. 8 shows a sequence diagram of Bootstrapping and Authentication processes of Case B.

(BS and Auth of Case B; FIG. 8)

Next, the processes of the BS in T20 and the Auth in T25 in FIG. 2 of Case B will be described with reference to FIG. 8. Case B assumes a situation in which the distance between the terminal 10 and the printer 100 is relatively large.

T500 to T532 are similar to T100 to T132 of FIG. 3. In T534, the printer 100 determines that the radio field intensity of the received AD is less than the threshold value, associates the MAC address "xxx" of the terminal 10 in the AD with the radio field intensity "Weak", and stores them in the memory 134.

T541 to T550 are similar to T141 to T200 of FIG. 5. In T551, the printer 100 determines that the MAC address "xxx" stored in the memory 134 is identical to the MAC address "xxx" in the AReq (YES in S5 of FIG. 4) as well as determines that the radio field intensity stored in the memory 134 is "Weak" (NO in S10). In this case, the printer 100 causes the display unit 114 to display the printer-side confirmation screen PCS in T552 (S20). Then, in T554, the printer 100 determines that the YES button in the screen PCS is not selected within the predetermined time (that is, the timeout) (NO in S25), terminates displaying the screen PCS, and terminates the process of FIG. 8 as the no-execution END.

As shown in Case B, in the situation in which the distance between the printer 100 and the terminal 10 is relatively large, it is highly likely that the user of the terminal 10 does not wish to have communication according to the DPP scheme (that is, the communication in which the public key PPK1 is used) executed between the printer 100 and the terminal 10. For example, a situation is assumed in which the terminal 10 is present at a location that is quite far from the printer 100 and the user of the terminal 10 wishes to establish a Wi-Fi connection between the AP 6 and a printer that is different from the printer 100. In this case, the terminal 10 receives the AD from the printer 100 (T520), and sends the AD and the AReq to the printer 100 (T532, T550), which is not intended by the user. In such a situation, if the printer 100 automatically executes the processes from T202 of FIG. 5 and sends the ARes to the terminal 10 (T210) in response to receiving the AReq from the terminal 10, the Wi-Fi connection may be established between the printer 100 and the AP 6. That is, a Wi-Fi connection may be established between a pair of devices (that is, the printer 100 and the AP 6) which is not intended by the user of the terminal 10.

Contrary to this, in Case B, since the radio field intensity of the AD is "Weak" in the case where the AD and the AReq are received from the terminal 10 (T550), the printer 100 restricts sending of the ARes by causing the display unit 114 to display the screen PCS (T552). Since the user of the terminal 10 does not wish to have the printer 100 establish the Wi-Fi connection, the user does not select the YES button in the printer-side confirmation screen PCS. As a result, the printer 100 determines the timeout (T554), and does not send the ARes to the terminal 10. As such, establishment of the Wi-Fi connection between the printer 100 and the AP 6 can be prevented. That is, establishment of the Wi-Fi connection between the pair of devices which is not intended by the user of the terminal 10 can be prevented.

Figure 9:
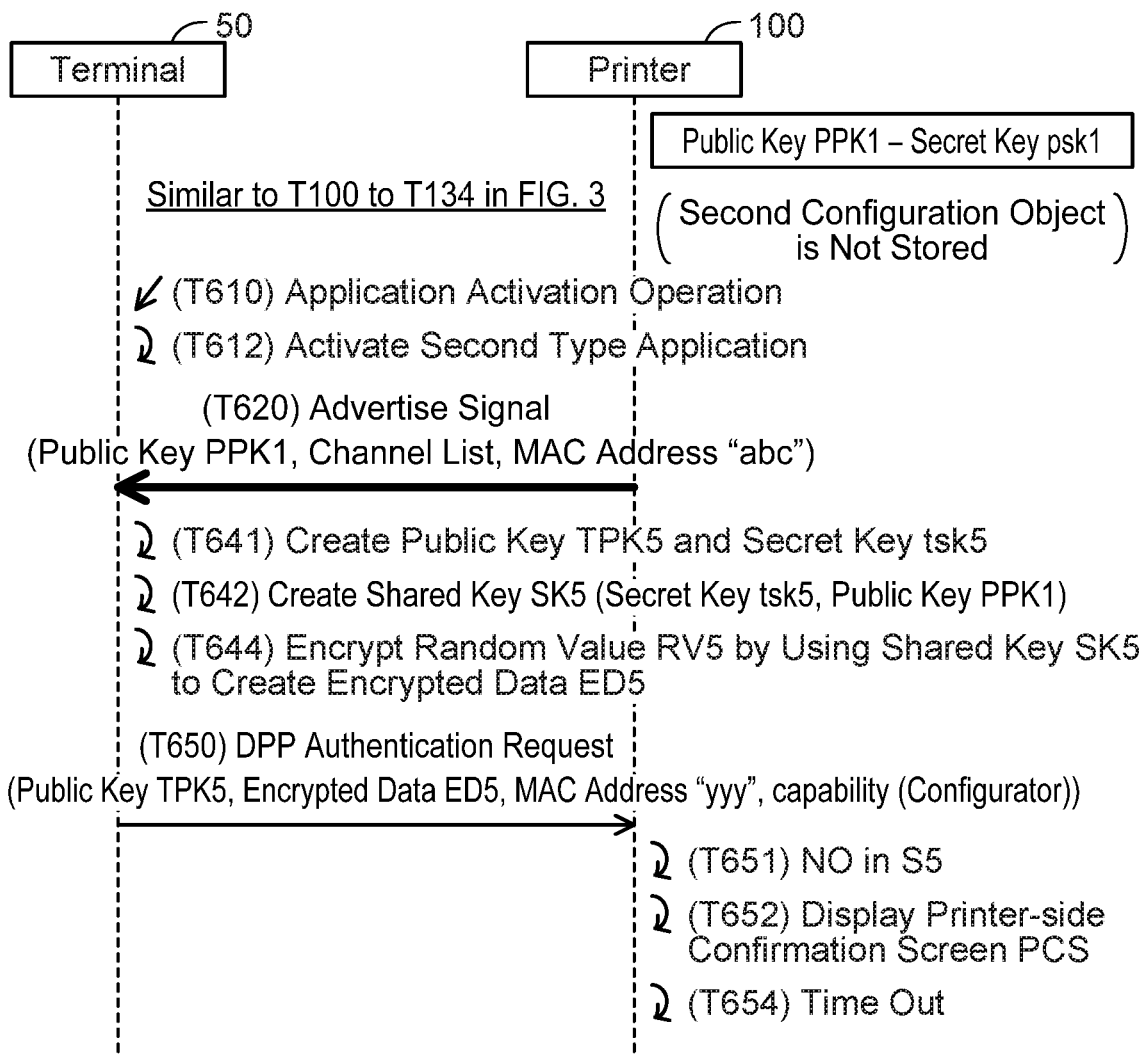
FIG. 9 shows a sequence diagram of Bootstrapping and Authentication processes of Case C.

(BS and Auth of Case C; FIG. 9)

Next, the processes of the BS in T20 and the Auth in T25 of FIG. 2 of another Case C will be described with reference to FIG. 9. The terminal 10 is provided with the first type app 40 provided by the vendor of the printer 100. Due to this, the user of the terminal 10 may highly likely wish to have the printer 100 establish the Wi-Fi connection. On the other hand, the terminal 50 is provided with the second type app 52 provided by the entity different from the vendor of the printer 100. Due to this, a user of the terminal 50 may less likely wish to have the printer 100 establish the Wi-Fi connection. Case C assumes a situation in which the user of the terminal 10 wishes to establish the Wi-Fi connection between the printer 100 and the AP 6, while the user of the terminal 50 wishes to establish a Wi-Fi connection between a printer different from the printer 100 and an AP different from the AP 6.

In Case C, firstly, processes similar to T100 to T134 of FIG. 3 are executed by the terminal 10 and the printer 100. As a result, the printer 100 associates the MAC address "xxx" of the terminal 10 with the radio field intensity "Strong" and stores them in the memory 134 (T134).

Then, before the AReq is sent from the terminal 10 to the printer 100 (that is, before T200 of FIG. 5), an activation operation for the second type app 52 is performed on the terminal 50 in T610 by the user of the terminal 50, and the second type app 52 is activated in T612. As a result, the terminal 50 executes following processes according to the second type app 52. The terminal 50 has already executed processes similar to T5 to T15 of FIG. 2 with the different AP before executing the processes from T610.

In T620, the terminal 50 receives the AD from the printer 100. Here, since the second type app 52 is not the first type app 40 provided by the vendor of the printer 100, it does not send an AD including the MAC address "yyy" of the terminal 50 to the printer 100 even when receiving the AD from the printer 100. As such, the MAC address "yyy" of the terminal 50 is not stored in the printer 100.

T641 to T650 are similar to T141 to T200 of FIG. 5 except that the terminal 50 is used instead of the terminal 10, and that a public key TPKS, a secret key tsk5, a shared key SKS, a random value RVS, encrypted data EDS, and the MAC address "yyy" of the terminal 50 are used. In T651, the printer 100 determines that the MAC address "xxx" stored in the memory 134 is not identical to the MAC address "yyy" in the AReq (NO in S5 of FIG. 4). In this case, the printer 100 cause the display unit 114 to display the printer-side confirmation screen PCS in T652 (S20). Then, in T654, the printer 100 determines that the YES button in the screen PCS is not selected within the predetermined time (that is, the timeout) (NO in S25 of FIG. 4), terminates displaying the screen PCS, and terminates the process of FIG. 9.

For example, a situation may be assumed in which the processes of T610 to T650 are executed between the terminal 50 and the printer 100 before T100 to T134 of FIG. 3 are executed. That is, a situation may be assumed in which the printer 100 receives the AReq from the terminal 50 in a situation where it does not store the MAC address "xxx" of the terminal 10 and the radio field intensity "Strong" in association with each other in the memory 134. In this case as well, the printer 100 determines NO in S5 of FIG. 4 in response to receiving the AReq from the terminal 50 in T650 because no MAC address is stored in the memory 134, and causes the display unit 114 to display the screen PCS in T652 (S20).

Here, if the printer 100 automatically executes the processes from T202 of FIG. 5 and sends the ARes to the terminal 50 in response to receiving the AReq from the terminal 50 (T650), a Wi-Fi connection may be established between the printer 100 and the different AP. That is, the Wi-Fi connection may be established between a pair of devices (that is, the printer 100 and the different AP) which is not intended by the user of the terminal 50.

Contrary to this, in Case C, in the case of receiving the AReq from the terminal 50 (T650), the printer 100 restricts sending of the ARes by causing the display unit 114 to display the printer-side confirmation screen PCS (T652) because the MAC address "xxx" of the terminal 10 stored in the memory 134 is not identical to the MAC address "yyy" of the terminal 50 in the AReq. Since the user of the terminal 50 does not wish to have the printer 100 establish the Wi-Fi connection, the user does not select the YES button in the screen PCS. As a result, the printer 100 determines the timeout (T654), and does not send the ARes to the terminal 50. As such, establishment of the Wi-Fi connection between the printer 100 and the different AP can be prevented. That is, establishment of the Wi-Fi connection between the pair of devices which is not intended by the user of the terminal 50 can be prevented.

Figure 10:
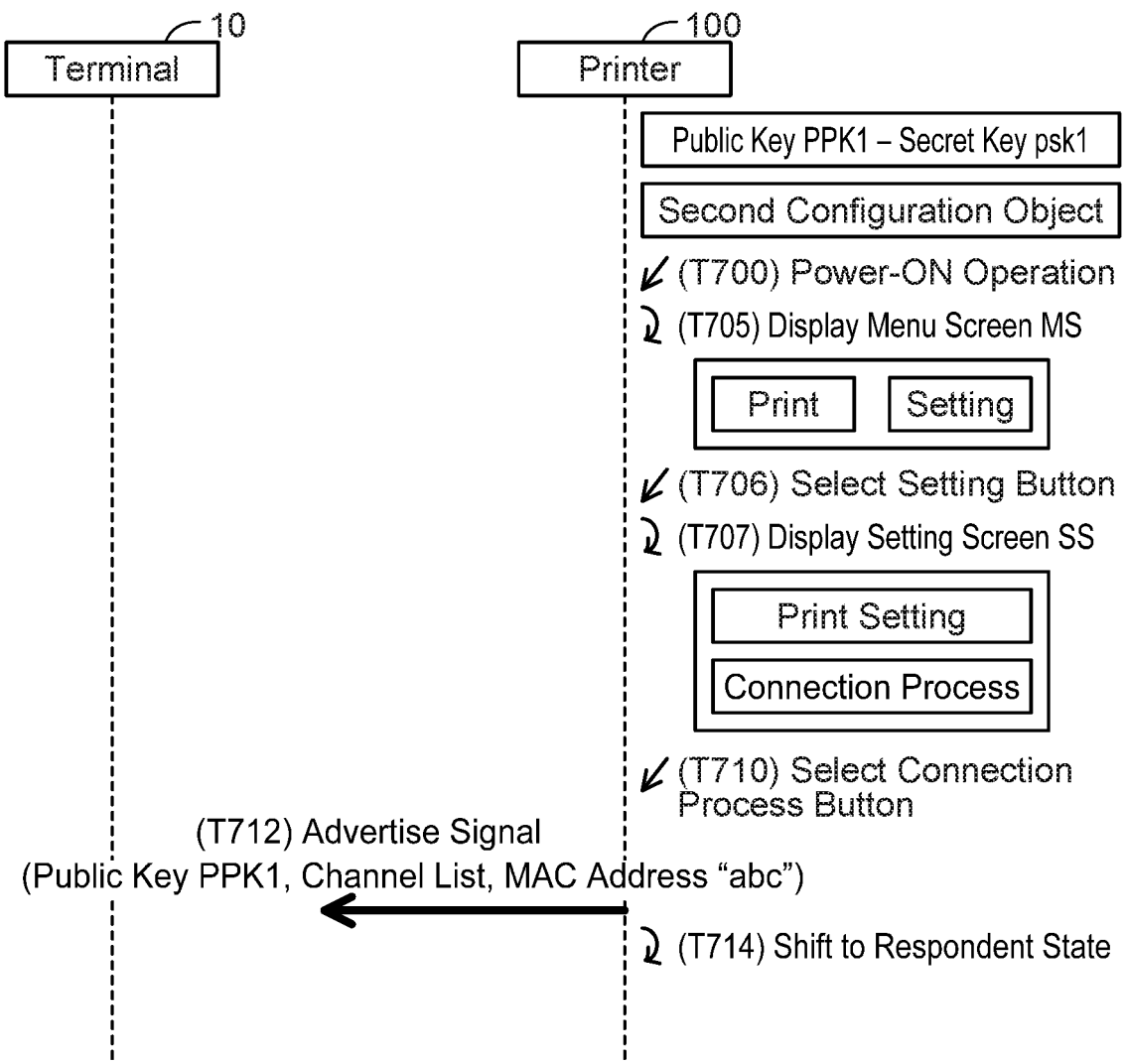
FIG. 10 shows a sequence diagram of a Bootstrapping process of Case D.

(BS of Case D; FIG. 10)

Next, the process of the BS of another Case D will be described with reference to FIG. 10. Case D is a state after T20 to T40 of FIG. 2 have been executed, that is, a state in which the memory 134 of the printer 100 already stores the second CO.

T700 and T705 are similar to T100 and T105 of FIG. 3. In the present case, since the memory 134 of the printer 100 stores the second CO, the printer 100 does not start the power supply to the BT I/F 118. In the situation where the printer 100 stores the second CO, the printer 100 can establish the Wi-Fi connection with the AP 6 by using the second CO. As such, the BS is less likely to be executed in the printer 100. Since the printer 100 does not start the power supply to the BT I/F 118 in such a situation, power consumption can thereby be reduced.

In the situation where the printer 100 stores the second CO, the user may wish to establish a Wi-Fi connection between the printer 100 and an AP that is different from the AP 6, for example. In this case, the user selects the setting button in the menu screen MS in T706. In T707, the printer 100 causes the display unit 114 to display a setting screen SS. The screen SS includes a print setting button for changing print settings of the printer 100 and a connection process button for instructing to execute the connection process. Further, in T710, the user selects the connection process button in the screen SS. In this case, the printer 100 starts the power supply to the BT I/F 118, starts repeatedly sending the AD to outside via the BT I/F 118 in T712, and shifts to the respondent state in T714. Due to this, the processes from T120 of FIG. 3 are executed in response to the first type app 40 being activated in the terminal 10.

The printer 100 is also capable of establishing the Wi-Fi connection with the AP 6 according to a normal Wi-Fi scheme (that is, a scheme using an SSID and a password) without using the DPP scheme. In this case, the memory 134 of the printer 100 stores wireless setting information (that is, the SSID and the password) for establishing the Wi-Fi connection with the AP 6. Even when the power of the printer 100 is turned on in such a state, the printer 100 does not start the power supply to the BT I/F 118 similarly to Case D of FIG. 10. This is because the printer 100 can use the wireless setting information to establish the Wi-Fi connection with the AP 6. Due to this, the power consumption of the printer 100 can be reduced.

Effects of Embodiment

In this embodiment, the printer 100 determines whether or not the radio field intensity of the received AD is equal to or greater than the threshold value in the case of receiving the AD from the terminal 10 (T132 of FIG. 3). Here, the situation in which the radio field intensity is equal to or greater than the threshold value (Case A of FIG. 3) means that the distance between the printer 100 and the terminal 10 is relatively small, that is, that the user of the terminal 10 highly likely wishes to have the communication using the public key PPK1 executed between the printer 100 and the terminal 10. Under such a situation, in response to receiving the AReq from the terminal 10 (T200 of FIG. 5), the printer 100 sends the ARes to the terminal 10 (T210), receives the second CO from the terminal 10 (T310 of FIG. 6), and establishes the Wi-Fi connection with the AP 6 by using the second CO (T35, T40 of FIG. 2).

On the other hand, the situation in which the radio field intensity is not equal to or greater than the threshold value (Case B of FIG. 8) means that the distance between the printer 100 and the terminal 10 is relatively large, that is, that the user of the terminal 10 highly likely does not wish to have the communication using the public key PPK1 executed between the printer 100 and the terminal 10. Under such a situation, in the case of receiving the AReq from the terminal 10 (T550), the printer 100 restricts sending of the ARes by causing the display unit 114 to display the printer-side confirmation screen PCS (T552). Since the YES button in the screen PCS is not selected by the user in Case B of FIG. 8 (T554), the Wi-Fi connection is not established between the printer 100 and the AP 6. Due to this, establishment of a Wi-Fi connection between a pair of devices which the user of the terminal 10 does not intend can be prevented. In the case where the user of the terminal 10 wishes to have the Wi-Fi connection established between the printer 100 and the AP 6 in Case B, the YES button in the screen PCS is selected by the user. In this case, the processes from T202 of FIG. 5 are executed, and the Wi-Fi connection is established between the printer 100 and the AP 6. As such, the Wi-Fi connection according to the user's intention can be established.

Further, in the present embodiment, the printer 100 determines whether or not the MAC address included in the AD is identical to the MAC address included in the AReq (S5) in the case of receiving the AD from the terminal 10 (T132 of FIG. 3) and receiving the AReq from the specific terminal (the terminal 10 or the terminal 50) (YES in S3 of FIG. 4). Here, the situation in which the MAC address included in the AD is identical to the MAC address included in the AReq (Case A of FIG. 5) means that the terminal 10 is the specific terminal, that is, that the AReq was sent from the terminal 10 which is the sender of the AD. Thus, it means that the user highly likely wishes to have the communication using the public key PPK1 executed between the printer 100 and the terminal 10. Under such a situation, the printer 100 sends the ARes to the terminal 10 (T210 of FIG. 5), receives the second CO from the terminal 10 (T310 of FIG. 6), and establishes the Wi-Fi connection with the AP 6 by using the second CO (T35, T40 of FIG. 2).

On the other hand, the situation in which the MAC address included in the AD is not identical to the MAC address included in the AReq (Case C of FIG. 9) means that the terminal 10 is not the specific terminal, that is, that the AReq was sent from a device that is different from the terminal 10 which is the sender of the AD. Thus, it means that the user does not likely wish to have the communication using the public key PPK1 executed between the printer 100 and the terminal 50. Under such a situation, in the case of receiving the AReq from the terminal 50 (T650 of FIG. 9), the printer 100 restricts sending of the ARes by causing the display unit 114 display the printer-side confirmation screen PCS (T652). In Case C of FIG. 9, the Wi-Fi connection between the printer 100 and the AP different from the AP 6 is not established since the YES button in the screen PCS is not selected by the user (T654). Due to this, establishment of the Wi-Fi connection between the pair of devices which is not intended by the user of the terminal 50 can be prevented. In a case where the user of the terminal 50 wishes to have the Wi-Fi connection established between the printer 100 and the different AP in Case C, the YES button in the screen PCS is selected by the user. In this case, the processes from T202 of FIG. 5 are executed, and the Wi-Fi connection is established between the printer 100 and the different AR As such, a Wi-Fi connection according to the user's intention can be established.

(Corresponding Relationships)

The printer 100, the terminal 10, and the AP 6 are respectively examples of "communication device", "first external device", and "second external device". Each of the terminal 10 and the terminal 50 may be an example of "specific external device". The BT I/F 118 and the Wi-Fi I/F 116 are respectively examples of "first wireless interface" and "second wireless interface". The public key PPK1 and the AD sent from the printer 100 are respectively examples of "public key" and "specific signal". The AReq, the ARes, and the second CO are respectively examples of "authentication request", "authentication response", and "connection information". The Wi-Fi connection established in T40 of FIG. 2 is an example of "wireless connection".

The printer-side confirmation screen PCS is an example of "instruction screen". The MAC address "xxx" of the terminal 10 and the MAC address (one of "xxx" and "yyy") in the AReq are respectively examples of "target identification information" and "specific identification information". The channel list, the communication channel used in T200 of FIG. 4, and the communication channel used in T40 of FIG. 2 are respectively examples of "communication channel information", "first communication channel", and "second communication channel". Accepting the power-ON operation by the user in the state where the second CO is not stored in the memory 134 and accepting the selection of the wireless setting button by the user in the state where the second CO is stored in the memory 134 are examples of "predetermined condition". The first type app 40 is an example of "application program". The selecting operation of the connection process button in the setting screen SS is an example of "specific operation". The SCont for AP and the hash value HV of the second CO are respectively examples of "received information" and "authentication information".

The process of T120 of FIG. 3 (as well as T520 of FIG. 8 and T620 of FIG. 9), the process of T132 (as well as T532), the process of S10 of FIG. 4, the process of T200 of FIG. 5 (as well as T550), the process of T210, the process of T310 of FIG. 6, and the processes of T35 and T40 of FIG. 2 are respectively examples of "send a public key", "receive a specific signal", "determine whether a radio field intensity of the received specific signal is equal to or greater than a threshold value", "receive an authentication request", "send an authentication response", "receive connection information", and "establish the wireless connection".

The process of T120 of FIG. 3 (as well as T520 of FIG. 8 and T620 of FIG. 9), the process of T132 (as well as T532), the process of T200 of FIG. 5 (as well as T550, T650), the process of S5 of FIG. 4, the process of T210, the process of T310 of FIG. 6, and the processes of T35 and T40 of FIG. 2 are respectively examples of "send a public key", "receive a specific signal", "receive an authentication request", "determine whether a radio field intensity of the received specific signal is equal to or greater than a threshold value", "send an authentication response", "receive connection information", and "establish the wireless connection".

(Variant 1) In T132 of FIG. 3, the terminal 10 may send an AD that does not include the MAC address "xxx" to the printer 100 via the BT I/F 18. In this case, in response to receiving the AD from the terminal 10 in T132 via the BT I/F 118, the printer 100 stores the radio field intensity "Strong" in the memory 134 in the case of determining that the radio field intensity of the received AD is equal to or greater than the threshold value. Then, the printer 100 skips the process of S5 in the case of receiving the AReq from the specific terminal (YES in S3 of FIG. 4), and determines whether or not the radio field intensity "Strong" is stored in the memory 134. In the case where the radio field intensity "Strong" is stored in the memory 134, the printer 100 proceeds to S15. On the other hand, in the case where the radio field intensity "Weak" is stored in the memory 134, the printer 100 proceeds to S20. In this variant, "specific signal" may not include "target identification information".

(Variant 2) In T134 of FIG. 3, the printer 100 may not determine whether or not the radio field intensity of the received AD is equal to or greater than the threshold value, and may only store the MAC address "xxx" in the memory 134. In this case, the printer 100 skips the process of S10 and executes the process of S15 in the case of receiving the AReq from the specific terminal (YES in S3 of FIG. 4) and determining that the MAC address stored in the memory 134 is identical to the MAC address in the AReq.

(Variant 3) For example, the AD sent from the printer 100 in T107 of FIG. 3 may not include the channel list or the MAC address "abc". That is, this AD simply needs to include the public key PPK1 at the least. In this case, in response to shifting from the non-respondent state to the respondent state in T109, the printer 100 monitors receipt of the AReq using one wireless channel among all the wireless channel which the printer 100 is capable of using. Further, in T200 of FIG. 5, the terminal 10 sequentially broadcasts the AReq by sequentially using all the wireless channels which the terminal 10 is capable of using. That is, "specific signal" may be information that is obtained by using at least the public key. Further, in this variant, "send communication channel information" may be omitted.

(Variant 4) The processes for creating the shared key (for example, SK1) (such as T142, T202 of FIG. 4) are not limited to the processes according to the ECDH described in the above embodiment, but may be other processes according to the ECDH. Further, the processes for creating the shared key are not limited to the processes according to the ECDH, and processes according to other schemes (such as Diffie-Hellman key exchange (DH)) may be executed instead. Further, in the above embodiment, the digital signatures DS1 and DS2 are created according to the ECDSA, however, they may be created according to other schemes (such as Digital Signature Algorithm (DSA), Rivest-Shamir-Adleman cryptosystem (RAS), etc.).

(Variant 5) For example, in T107 of FIG. 3, the printer 100 may repeatedly sending to outside a signal according to the BT scheme (such as a Scan Request) which is a different signal from the AD. In this variant, this different signal is an example of "specific signal".

(Variant 6) In the case of determining NO in S5 of FIG. 4, the printer 100 may terminate the process of FIG. 4 as the no-execution END without executing S20 and S25. Alternatively, in the case of determining NO in S10, the printer 100 may terminate the process of FIG. 4 as the no-execution END without executing S20 and S25. In this variant, not sending the ARes in the case of NO in S5 or in the case of NO in S10 is an example of "the sending of the authentication response to the first external device is restricted". Further, in this variant, "cause the display unit to display an instruction screen" may be omitted.

(Variant 7) In T132 of FIG. 3, the terminal 10 may send an AD including a device name of the terminal 10, instead of the MAC address "xxx", via the BT I/F 18 to the printer 100. In this case, in T134, the printer 100 associates the device name of the terminal in the AD with the radio field intensity "Strong" and store them. Further, the printer 100 receives an AReq including the device name of the terminal 10, instead of the MAC address "xxx", from the terminal 10 via the Wi-Fi I/F 116 in T200 of FIG. 5, and executes the processes from T202 in a case where the device name stored in the memory 134 is identical to the device name in the AReq. In this variant, the device name of the terminal 10 is an example of "target identification information" and the "specific identification information". Generally speaking, the "target identification information (as well as the specific identification information)" simply needs to be information by which "first external device (as well as the specific external device)" is identified.

(Variant 8) For example, the processes of T107 and T120 of FIG. 3 may be omitted. In this case, the printer 100 sends the AD including the public key PPK1 and the like to the terminal 10 via the BT I/F 118 after having received the AD from the terminal 10 in T132 via the BT I/F 118. That is, in "receive a specific signal", "specific signal" may be received before "public key" is received by "first external device".

(Variant 9) In T35 of FIG. 2, the process of the NA may be executed between the terminal 10 and the printer 100, and a Wi-Fi connection may thereby be established between the terminal 10 and the printer 100. That is, "second external device" may be the same device as "first external device".

(Variant 10) The AD sent from the printer 100 in T107 of FIG. 3 and the like may further include activation information for activating the first type app 40. In this case, the terminal 10 starts the power supply to the BT I/F 18 in response to being turned on, activates the first type app 40 in response to receiving the AD including the activation information from the printer 100, and executes the processes from T122.

(Variant 11) In the above embodiment, the Wi-Fi connection between the printer 100 and the AP 6 is established by using the terminal 10. Instead of this, for example, a Wi-Fi connection may be established between the printer 100 operating as a Group Owner (G/O) of the WFD scheme (that is, a device operating as a parent station) and another device (that is, a device operating as a child station) by using the terminal 10. That is, "second external device" may not be "parent station".

(Variant 12) In T650 of FIG. 9, the terminal 50 may send an AReq that does not include the MAC address "yyy" to the printer 100. In this case, in response to receiving the AReq from the terminal 50 via the Wi-Fi I/F 116, the printer 100 may determine that no MAC address is included in the AReq, and may cause the display unit 114 to display the printer-side confirmation screen PCS.

(Variant 13) The printer 100 may include a wireless interface in accordance with a wireless communication scheme (such as a ZigBee scheme) that is different from the BT scheme, instead of the BT I/F 118. In this variant, this wireless interface is an example of "first wireless interface".

(Variant 14) "Communication device" may not be the printer, and may be another device such as a scanner, a multi-function peripheral, mobile terminal, a PC, and a server.

(Variant 15) In the embodiment above, the processes of FIGS. 2 to 10 are implemented by software (that is, the program 136), however, at least one of these processes may be implemented by hardware such as a logic circuit.

What is claimed is:

1. A communication device comprising:
a first wireless interface;
a second wireless interface different from the first wireless interface;
a processor; and
a memory storing computer-readable instructions therein, the computer-readable instructions, when executed by the processor, causing the communication device to:
send a public key externally via the first wireless interface;
receive a specific signal from a first external device via the first wireless interface;
in a case where the specific signal is received from the first external device, determine whether a radio field intensity of the received specific signal is equal to or greater than a threshold value;
after the public key has been sent externally, receive an authentication request in which the public key is used from the first external device via the second wireless interface;
in a case where it is determined that the radio field intensity is equal to or greater than the threshold value and the authentication request is received from the first external device, send an authentication response to the first external device via the second wireless interface, wherein in a case where it is determined that the radio field intensity is not equal to or greater than the threshold value and the authentication request is received from the first external device, sending of the authentication response to the first external device is restricted;
after the authentication response has been sent to the first external device, receive connection information from the first external device via the second wireless interface, the connection information being for establishing a wireless connection between the communication device and a second external device via the second wireless interface; and
in a case where the connection information is received from the first external device, establish, by using the connection information, the wireless connection between the communication device and the second external device via the second wireless interface.

2. The communication device as in claim 1, further comprising:
a display unit,
wherein the computer-readable instructions, when executed by the processor, further cause the communication device to:
in the case where it is determined that the radio field intensity is not equal to or greater than the threshold value and the authentication request is received from the first external device, cause the display unit to display an instruction screen for instructing to execute the sending of the authentication response, wherein the sending of the authentication response to the first external device is restricted by causing the display unit to display an instruction screen,
wherein in a case where it is instructed to execute the sending of the authentication response in a situation where the instruction screen is displayed, the authentication response is sent to the first external device via the second wireless interface.

3. The communication device as in claim 1, wherein the specific signal includes target identification information for identifying the first external device,
in a case where it is determined that the radio field intensity is equal to or greater than the threshold value and the authentication request including the target identification information is received from the first external device identified by the target identification information, the authentication response is sent to the first external device via the second wireless interface, and
in a case where the authentication request that does not include the target identification information is received from a specific external device different from the first external device via the second wireless interface, the sending of the authentication response to the specific external device is restricted.

4. The communication device as in claim 1, wherein the computer-readable instructions, when executed by the processor, further cause the communication device to:
in a case where a predetermined condition is satisfied, shift an operation state of the communication device from a non-respondent state to a respondent state, the non-respondent state being a state in which the authentication response is not sent in response to receiving the authentication request, the respondent state being a state in which the authentication response is sent in response to receiving the authentication request,
wherein in a case where it is determined that the radio field intensity is equal to or greater than the threshold value and the authentication request is received from the first external device after the operation state of the communication device has been shifted to the respondent state, the authentication response is sent to the first external device via the second wireless interface.

5. The communication device as in claim 4, wherein
the computer-readable instructions, when executed by the processor, further cause the communication device to:
send communication channel information externally via the first wireless interface, the communication channel information indicating a first communication channel which is predetermined at the communication device,
wherein the respondent state is a state in which receipt of the authentication request by using the first communication channel is monitored and the authentication response is sent in response to receiving the authentication request, and
in a case where it is determined that the radio field intensity is equal to or greater than the threshold value and the authentication request by using the first communication channel is received from the first external device after the operation state of the communication device has been shifted to the respondent state, the authentication response is sent to the first external device via the second wireless interface.

6. The communication device as in claim 5, wherein
the wireless connection is established between the communication device and the second external device via the second wireless interface by using a second communication channel different from the first communication channel.

7. The communication device as in claim 1, wherein
the specific signal is sent from the first external device to the communication device according to an application program provided by a vender of the communication device.

8. The communication device as in claim 1, wherein
after the public key has been received by the first external device, the specific signal is received from the first external device via the first wireless interface.

9. The communication device as in claim 1, wherein
the first wireless interface is configured to execute wireless communication according to a Bluetooth (registered trademark) scheme, and
an Advertise signal including the public key is repeatedly sent externally, the Advertise signal being according to the Bluetooth scheme.

10. The communication device as in claim 9, wherein
the first wireless interface is configured to execute wireless communication according to version 4.0 or higher of the Bluetooth scheme.

11. The communication device as in claim 1, wherein
the computer-readable instructions, when executed by the processor, further cause the communication device to:
in a case where the connection information is received, store the connection information in the memory,
wherein in a case where the communication device is turned on in a situation where the connection information is not stored in the memory, the public key is sent externally via the first wireless interface, and
in a case where the communication device is turned on in a situation where the connection information is stored in the memory, the public key is not sent.

12. The communication device as in claim 11, further comprising:
an operation unit,
wherein in a case where a specific operation is accepted via the operation unit after the communication device has been turned on in the situation where the connection information is stored in the memory, the public key is sent externally.

13. The communication device as in claim 1, wherein
the second external device is different from the first external device and is a parent device that is to operate as a parent station in a wireless network, and
the wireless connection is established between the communication device and the second external device via the second wireless interface such that the communication device participates in the wireless network as a child station.

14. The communication device as in claim 1, wherein
the connection information includes authentication information for authenticating received information which is received from the second external device.

15. The communication device as in claim 1, wherein
the computer-readable instructions, when executed by the processor, further cause the communication device to:
after the authentication response has been sent, cause the communication device to operate as an Enrollee according to a Wi-Fi standard.

16. A communication device comprising:
a first wireless interface;
a second wireless interface different from the first wireless interface;
a processor; and
a memory storing computer-readable instructions therein, the computer-readable instructions, when executed by the processor, causing the communication device to:
send a public key externally via the first wireless interface;
receive from a first external device a specific signal including target identification information for identifying the first external device via the first wireless interface;
after the public key has been sent externally, receive an authentication request in which the public key is used from a specific external device via the second wireless interface, the authentication request including specific identification information for identifying the specific external device;
in a case where the specific signal is received from the first external device and the authentication request is received from the specific external device, determine whether the specific identification information included in the authentication request is identical to the target identification information included in the specific signal;
in a case where it is determined that the specific identification information is identical to the target identification information, send an authentication response to the specific external device which is identical to the first external device via the second wireless interface, wherein in a case where it is determined that the specific identification information is not identical to the target identification information, sending of the authentication response to the specific external device is restricted;
after the authentication response has been sent to the specific external device, receive connection information from the specific external device via the second wireless interface, the connection information being for establishing a wireless connection between the communication device and a second external device via the second wireless interface; and
in a case where the connection information is received from the specific external device, establish, by using the connection information, the wireless connection between the communication device and the second external device via the second wireless interface.

17. The communication device as in claim 16, further comprising:
a display unit,
wherein the computer-readable instructions, when executed by the processor, further cause the communication device to:
in the case where it is determined that the specific identification information is not identical to the target identification information, cause the display unit to display an instruction screen for instructing to execute the sending of the authentication response, wherein the sending of the authentication response to the specific external device is restricted by causing the display unit to display the instruction screen,
wherein in a case where it is instructed to execute the sending of the authentication response in a situation where the instruction screen is displayed, the authentication response is sent to the specific external device via the second wireless interface.

18. The communication device as in claim 16, wherein the computer-readable instructions, when executed by the processor, further cause the communication device to:
in a case where a predetermined condition is satisfied, shift an operation state of the communication device from a non-respondent state to a respondent state, the non-respondent state being a state in which the authentication response is not sent in response to receiving the authentication request, the respondent state being a state in which the authentication response is sent in response to receiving the authentication request,
wherein in a case where it is determined that the specific identification information is identical to the target identification information after the operation state of the communication device has been shifted to the respondent state, the authentication response is sent to the specific external device via the second wireless interface.

19. The communication device as in claim 18, wherein the computer-readable instructions, when executed by the processor, further cause the communication device to:
send communication channel information externally via the first wireless interface, the communication channel information indicating a first communication channel which is predetermined at the communication device,
wherein the respondent state is a state in which receipt of the authentication request by using the first communication channel is monitored and the authentication response is sent in response to receiving the authentication request, and
in a case where it is determined that the specific identification information is identical to the target identification information and the authentication request by using the first communication channel is received from the specific external device after the operation state of the communication device has been shifted to the respondent state, the authentication response is sent to the specific external device via the second wireless interface.

20. A communication device comprising:
a first wireless interface;
a second wireless interface different from the first wireless interface;
a display unit;
a processor; and
a memory storing computer-readable instructions therein, the computer-readable instructions, when executed by the processor, causing the communication device to:
send a public key externally via the first wireless interface;
after the public key has been sent externally, receive an authentication request in which the public key is used from a first external device via the second wireless interface;
in a case where the authentication request is received from the first external device, cause the display unit to display an instruction screen for instructing to execute sending of an authentication response;
in a case where it is instructed to execute the sending of the authentication response in a situation where the instruction screen is displayed, send the authentication response to the first external device via the second wireless interface;
after the authentication response has been sent to the first external device, receive connection information from the first external device via the second wireless interface, the connection information being for establishing a wireless connection between the communication device and a second external device via the second wireless interface; and
in a case where the connection information is received from the first external device, establish, by using the connection information, the wireless connection between the communication device and the second external device via the second wireless interface.

* * * * *